US012714917B2

(12) United States Patent
Ranford

(10) Patent No.: US 12,714,917 B2
(45) Date of Patent: Aug. 25, 2026

(54) METHOD FOR FINE-TUNING A PUTTER AND MANUFACTURE THEREOF

(71) Applicant: FINE-TUNED COMPONENTS LIMITED, Riverhead (NZ)

(72) Inventor: Peter Hayden Ranford, Riverhead (NZ)

(73) Assignee: FINE-TUNED COMPONENTS LIMITED, Riverhead (NZ)

( * ) Notice: Subject to any disclaimer, the term of this patent is extended or adjusted under 35 U.S.C. 154(b) by 726 days.

(21) Appl. No.: 17/609,207

(22) PCT Filed: Jan. 21, 2021

(86) PCT No.: PCT/NZ2021/050007
§ 371 (c)(1),
(2) Date: Nov. 5, 2021

(87) PCT Pub. No.: WO2021/150127
PCT Pub. Date: Jul. 29, 2021

(65) Prior Publication Data
US 2022/0203181 A1 Jun. 30, 2022

(30) Foreign Application Priority Data
Jan. 21, 2020 (NZ) ........................................ 760972

(51) Int. Cl.
*A63B 53/00* (2015.01)
*A63B 24/00* (2006.01)
(Continued)

(52) U.S. Cl.
CPC ........ *A63B 53/007* (2013.01); *A63B 24/0003* (2013.01); *A63B 60/46* (2015.10);
(Continued)

(58) Field of Classification Search
CPC ........... A63B 2102/32; A63B 2220/05; A63B 2220/806; A63B 2230/62; A63B 24/0003; A63B 53/007; A63B 60/46; G06V 40/23
See application file for complete search history.

(56) References Cited

U.S. PATENT DOCUMENTS 5,911,636 A * 6/1999 Schmoll ................ A63B 60/42 473/409
6,203,443 B1 3/2001 Britton
(Continued)

FOREIGN PATENT DOCUMENTS

CN 102083504 A 6/2011
CN 104168965 A 11/2014
(Continued)

OTHER PUBLICATIONS

Thomas Tanner,"A guide to the Ping colour dot system", Dec. 6, 2019,golfbidder,<https://www.golfbidder.co.uk/guides-and-advice/buyers-guides/a-guide-to-the-ping-colour-dot-system> (Year: 2019).*

*Primary Examiner* — Justin L Myhr
(74) *Attorney, Agent, or Firm* — Holzer Patel Drennan

(57) ABSTRACT

Described herein is a method for fine-tuning a putter and manufacture thereof. More specifically, an application (App) that is utilised for static and dynamic data point analysis along with algorithms to best determine how attributes of a putter need to be set up to maximise consistency of a user's putter stroke and roll of the ball. A customised putter is tailored and manufactured for each individual based on the output data of the App and a fitting system of the putter is multi-adjustable therein.

18 Claims, 36 Drawing Sheets

(51) Int. Cl.
*A63B 60/46* (2015.01)
*G06V 40/20* (2022.01)
*A63B 102/32* (2015.01)

(52) U.S. Cl.
CPC .......... *G06V 40/23* (2022.01); *A63B 2102/32* (2015.10); *A63B 2220/05* (2013.01); *A63B 2220/806* (2013.01); *A63B 2230/62* (2013.01)

(56) References Cited

U.S. PATENT DOCUMENTS

| | | | | |
|---|---|---|---|---|
| 9,261,526 | B2 | 2/2016 | Bentley et al. | |
| 9,333,390 | B1 | 5/2016 | Manwaring et al. | |
| 10,213,645 | B1 | 2/2019 | Wu et al. | |
| 2001/0029207 | A1* | 10/2001 | Cameron | A63B 53/007 473/151 |
| 2006/0030420 | A1* | 2/2006 | Roake | A63B 60/02 473/340 |
| 2008/0235934 | A1 | 10/2008 | Burnett et al. | |
| 2013/0085009 | A1* | 4/2013 | Thomas | A63B 60/00 473/226 |
| 2013/0116808 | A1* | 5/2013 | Molinari | A63B 24/0003 700/91 |
| 2013/0165246 | A1 | 6/2013 | Jeffery et al. | |
| 2013/0296078 | A1 | 11/2013 | Solheim et al. | |
| 2016/0335914 | A1* | 11/2016 | Anderson | G09B 19/22 |
| 2017/0189754 | A1* | 7/2017 | Leech | G06V 40/23 |
| 2018/0071582 | A1 | 3/2018 | Bentley et al. | |
| 2019/0009133 | A1 | 1/2019 | Mettler May | |
| 2021/0101065 | A1* | 4/2021 | Okazaki | A63B 24/0006 |

FOREIGN PATENT DOCUMENTS

| | | | |
|---|---|---|---|
| JP | 2013532549 | A | 8/2013 |
| JP | 2014528275 | A | 10/2014 |
| WO | 2014144824 | A1 | 9/2014 |

* cited by examiner

Fine-Tuned App Walkthrough

| Page | Step | Item | Input |
|---|---|---|---|
| Page 1 | New Fitting Session | Select fitting session or Spec fillout | |
| Page 2 | Player information | Name | Fillout |
| | | Email | Fillout |
| | | Ph | Fillout |
| | | Handicap | Fillout |
| | | Height | Measurement |
| | | WTG (wrist to Ground) | Measurement/coding |
| | | Dexterity | Dropbox |
| Page 3 | Initial Setup Analysis | Putter Model | Fillout |
| | | Putter Category | Dropbox/coding |
| | | Putter Length | Dropbox/coding |
| | | Shaft plane angle | Dropbox/coding |
| | | Dominant eye | Dropbox |
| | | Aim tendancy | Dropbox/coding |
| | | Distance from the ball | Dropbox |
| | | Tempo | Dropbox/coding |
| | | Stroke Direction | Dropbox/coding |
| | | Face rotation | Dropbox/coding |
| | | Miss Tendancy | Dropbox/coding |
| Page 4 | Initial Setup photo | Down the line (DTL) | Camera capture |
| Page 5 | Classify photo/analyse | Hand position relative to shoulders | Image Selection /coding |
| Page 6 | | Shaft plane relative to forearms | Image Selection /coding |
| Page 7 | | Eyeline relative to ball position | Image Selection /coding |
| Page 8 | | Posture angle | Image Selection /coding |
| Page 9 | Initial setup Photo | Face On | Camera capture |
| Page 10 | Classify photo/analyse | Ball position relative to feet | Image Selection /coding |
| Page 11 | | Shaft lean relative to ground plane | Image Selection /coding |
| Page 12 | Setup fitting | Specification Recommendation from algorithms: | |
| | | Incudes : Head, alignment lines, colour, neck , length, lie, loft, headweight, grip | |
| | | Dynamic assesment of following: | |
| | | Aim tendancy | Dropbox/coding |
| | | Distance from the ball | Dropbox |
| | | Tempo | Dropbox/coding |
| | | Stroke Direction | Dropbox/coding |
| | | Face rotation | Dropbox/coding |
| | | Start Direction | Dropbox/coding |
| | | Launch Dynamics | Dropbox/coding |
| Page 13 | Fine-Tuned Setup | Down the line | Camera capture |
| Page 14 | | Hand position relative to shoulders | Image Selection |
| Page 15 | | Shaft plane relative to forearms | Image Selection |
| Page 16 | | Eyeline relative to ball position | Image Selection |
| Page 17 | | Posture angle | Image Selection |
| Page 18 | | Face On | Camera capture |
| Page 19 | | Ball position relative to feet | Image Selection |
| Page 20 | | Shaft lean relative to ground plane | Image Selection |
| Page 21 | Fine-Tuned Setup fitting | Specification Recommendation from algorithms: | |
| Page 22 | | Incudes : Head, alignment lines, colour, neck , length, lie, loft, headweight, grip | |
| | | Dynamic assesment of following: | |
| | | Aim tendancy | Dropbox |
| | | Distance from the ball | Dropbox |
| | | Tempo | Dropbox/coding |
| | | Stroke Direction | Dropbox |
| | | Face rotation | Dropbox |
| | | Start Direction | Dropbox |
| | | Launch Dynamics | Dropbox |
| Page 23 | Aprroval of fitting | Publishes PDF report, Spec build and CSV of fitting session | |

FIGURE 1

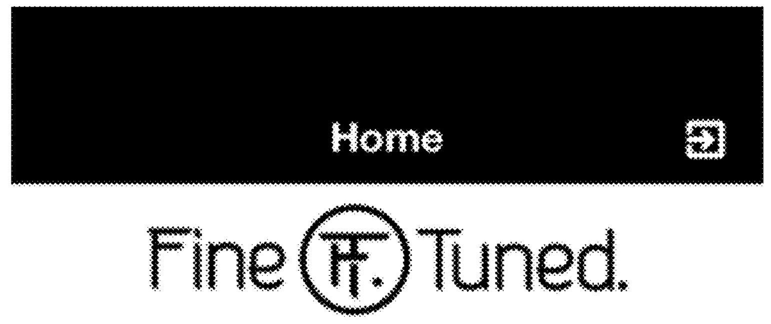
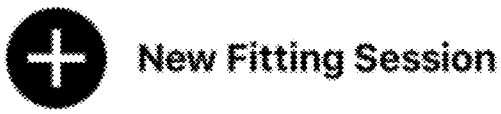
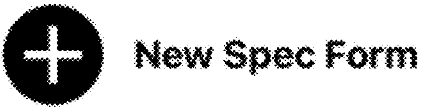
FIGURE 2

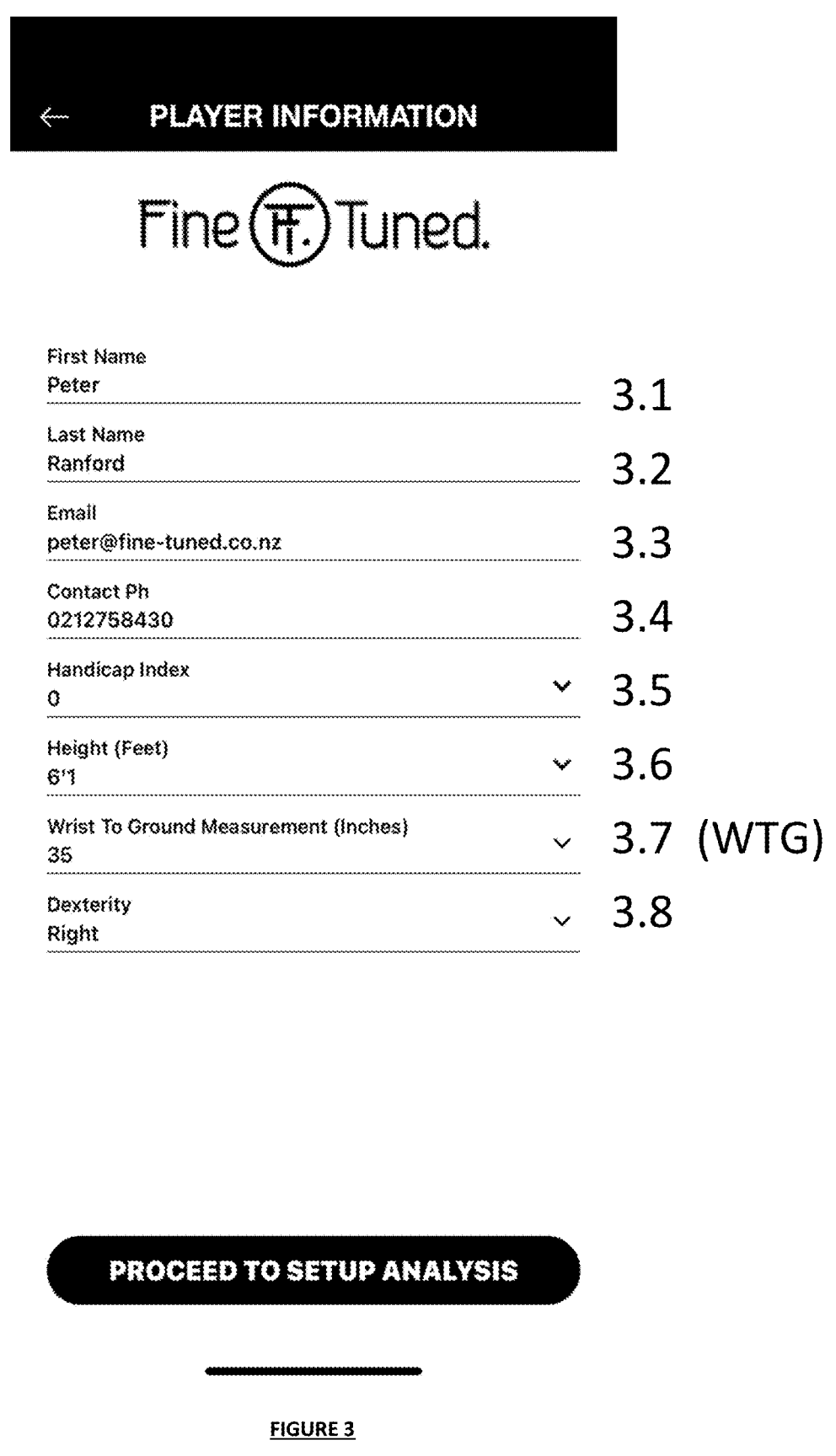

PLAYER INFORMATION

Fine TT. Tuned.

First Name
Peter — 3.1

Last Name
Ranford — 3.2

Email
peter@fine-tuned.co.nz — 3.3

Contact Ph
0212758430 — 3.4

Handicap Index
0 — 3.5

Height (Feet)
6'1 — 3.6

Wrist To Ground Measurement (Inches)
35 — 3.7 (WTG)

Dexterity
Right — 3.8

PROCEED TO SETUP ANALYSIS

FIGURE 3

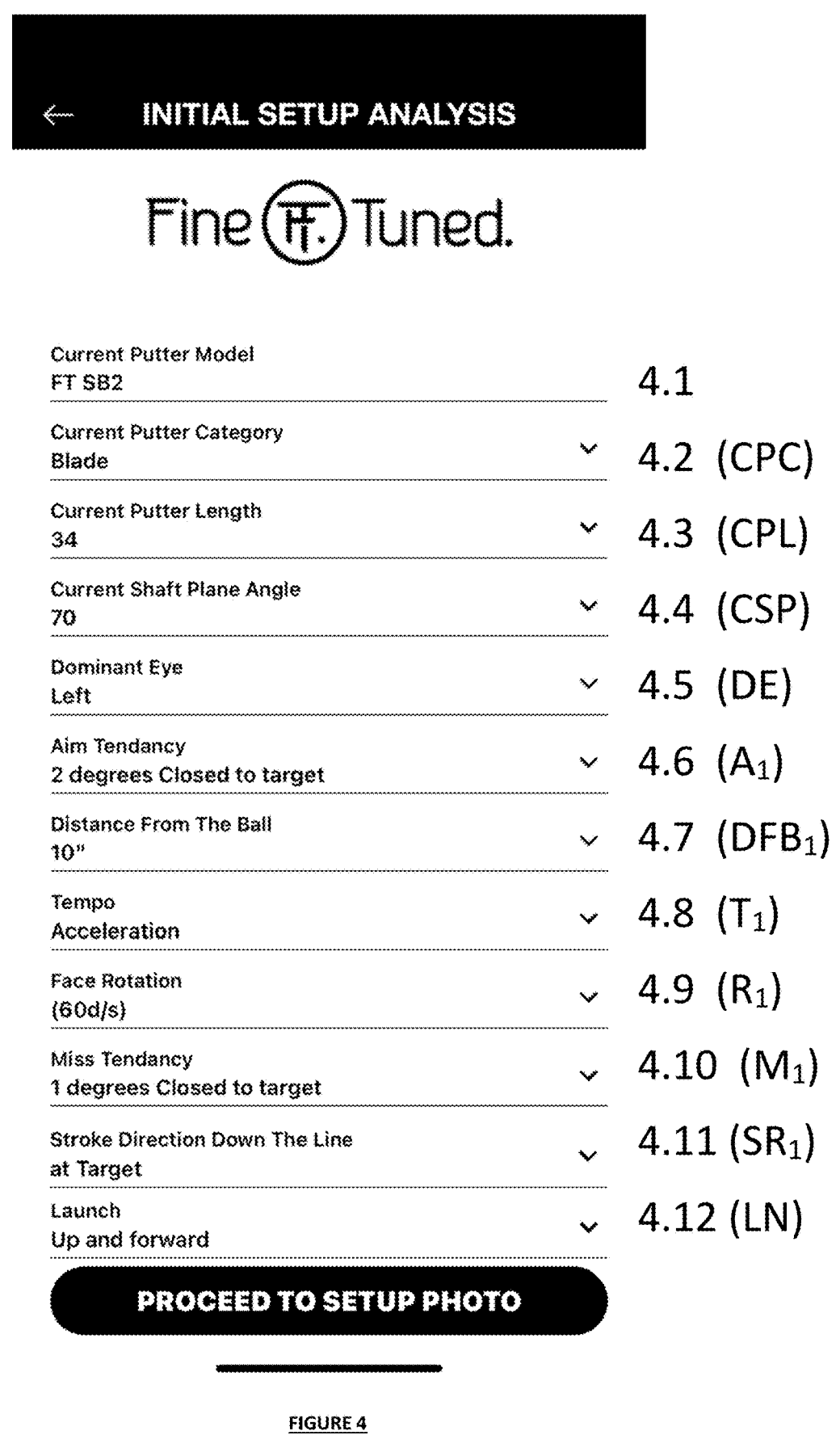

← INITIAL SETUP ANALYSIS

Fine (FT.) Tuned.

| Field | Value | Label |
| --- | --- | --- |
| Current Putter Model | FT SB2 | 4.1 |
| Current Putter Category | Blade | 4.2 (CPC) |
| Current Putter Length | 34 | 4.3 (CPL) |
| Current Shaft Plane Angle | 70 | 4.4 (CSP) |
| Dominant Eye | Left | 4.5 (DE) |
| Aim Tendancy | 2 degrees Closed to target | 4.6 ($A_1$) |
| Distance From The Ball | 10" | 4.7 ($DFB_1$) |
| Tempo | Acceleration | 4.8 ($T_1$) |
| Face Rotation | (60d/s) | 4.9 ($R_1$) |
| Miss Tendancy | 1 degrees Closed to target | 4.10 ($M_1$) |
| Stroke Direction Down The Line | at Target | 4.11 ($SR_1$) |
| Launch | Up and forward | 4.12 (LN) |

PROCEED TO SETUP PHOTO

FIGURE 4

← INITIAL SETUP PHOTO
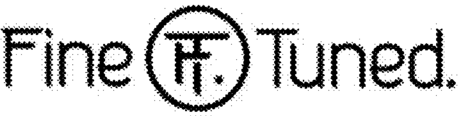
DOWN THE LINE
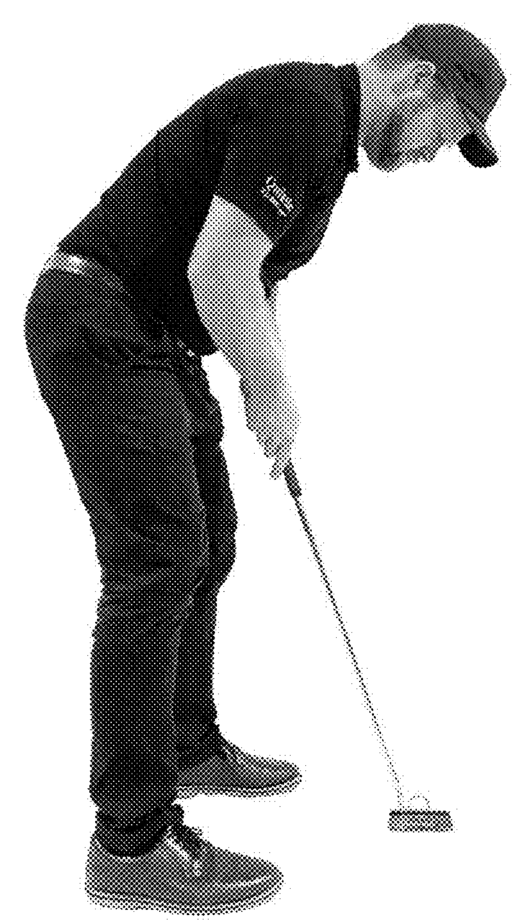
PROCEED TO CLASSIFICATION
FIGURE 5

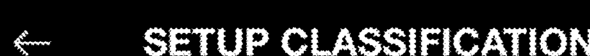
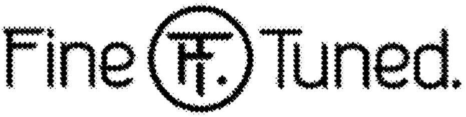
HAND POSITION
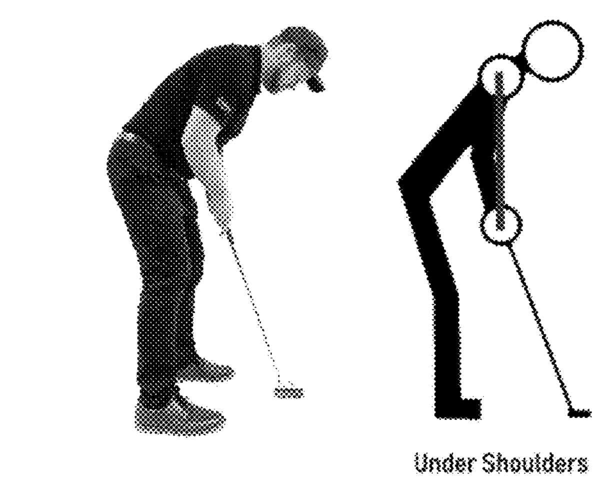
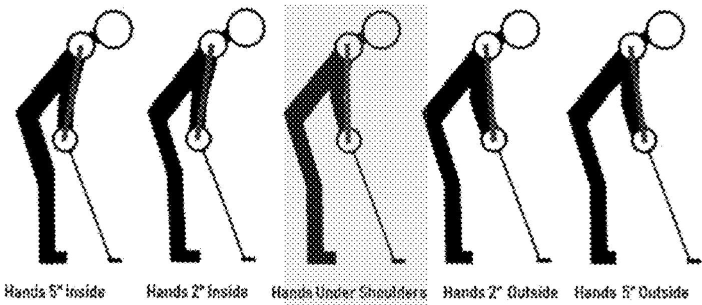
1 2 3 4 5
= Categorise code value of $\mathbf{HP_1}$
PROCEED TO CLASSIFICATION
FIGURE 6

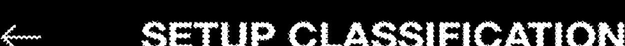
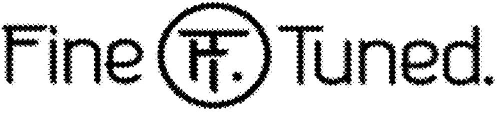
SHAFT TO FOREARM PLANE
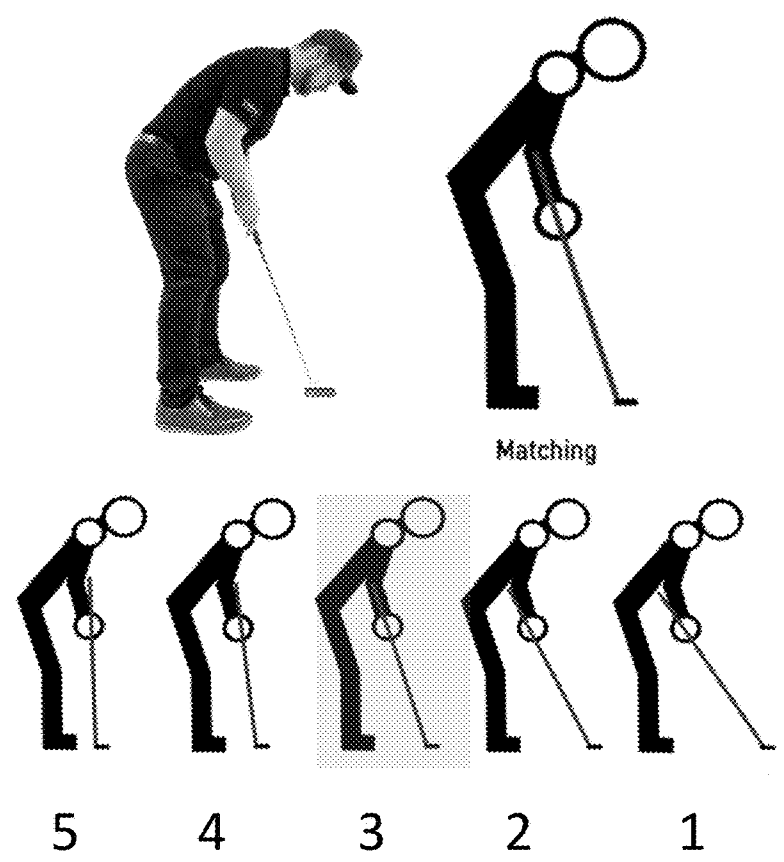
= Categorise code value of $\mathbf{SP_1}$
PROCEED TO CLASSIFICATION
FIGURE 7

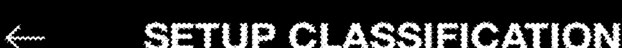
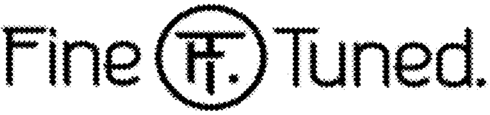
EYELINE
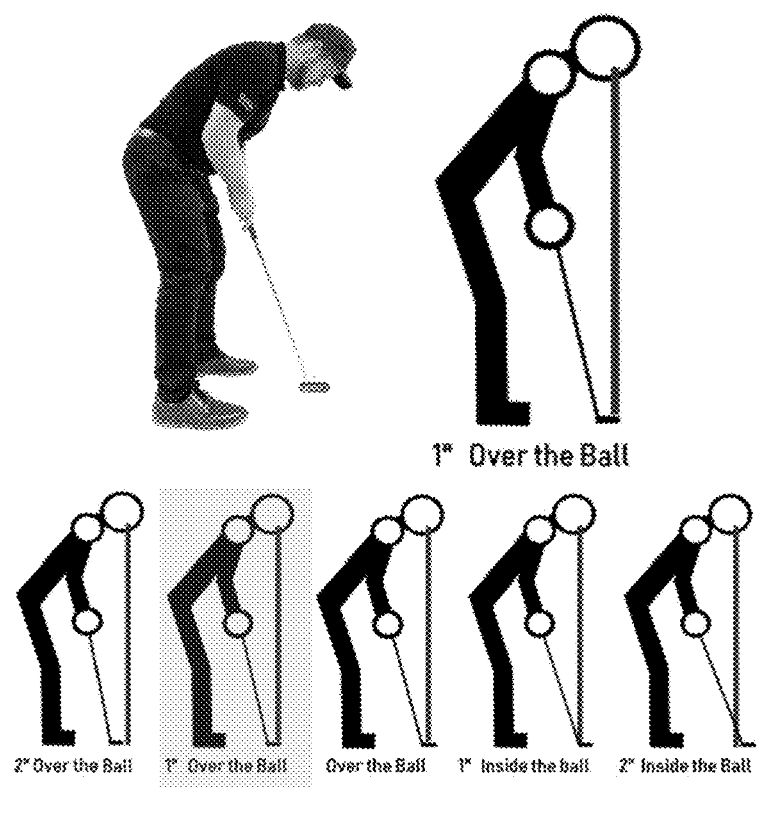
1 2 3 4 5
= Categorise code value of $\mathbf{E_1}$
PROCEED TO CLASSIFICATION
FIGURE 8

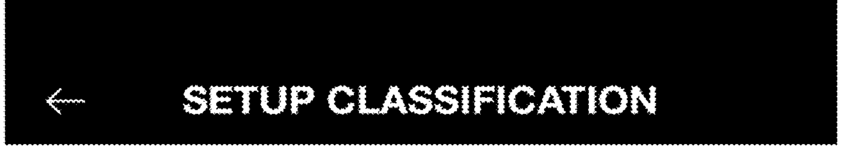
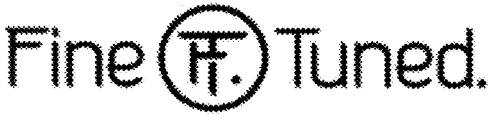
POSTURE
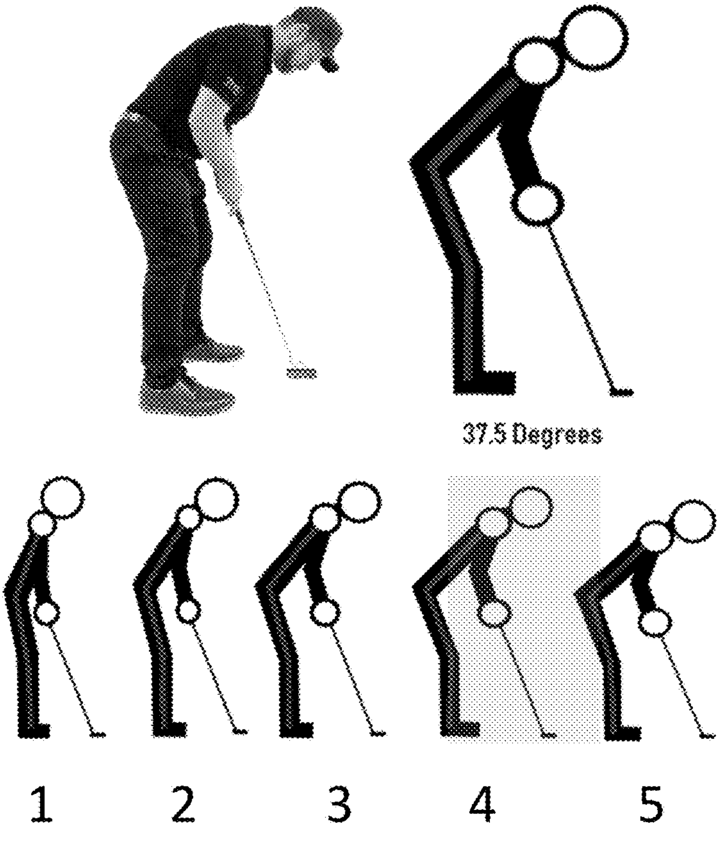
= Categorise code value of $\mathbf{P_1}$
PROCEED TO FACE ON PHOTO
FIGURE 9

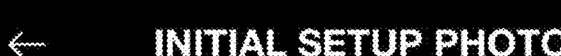
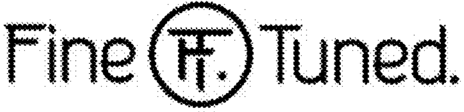
FACE ON
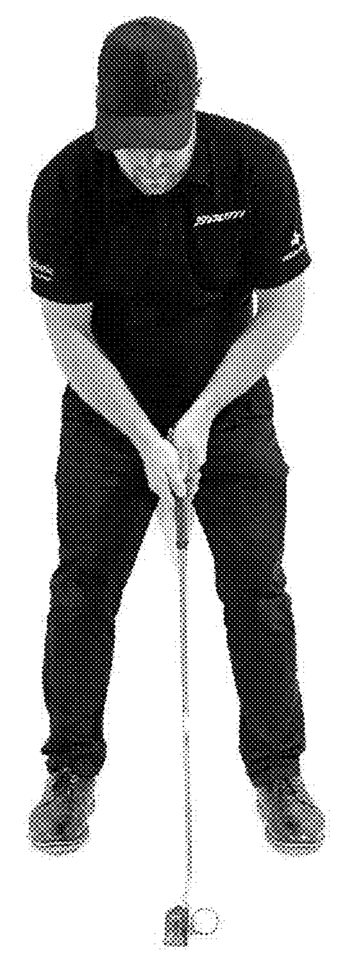
PROCEED TO CLASSIFICATION
FIGURE 10

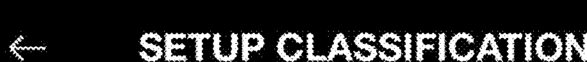
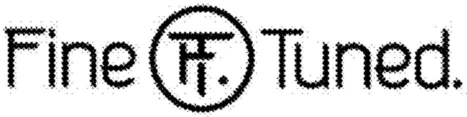
BALL POSITION FACE ON
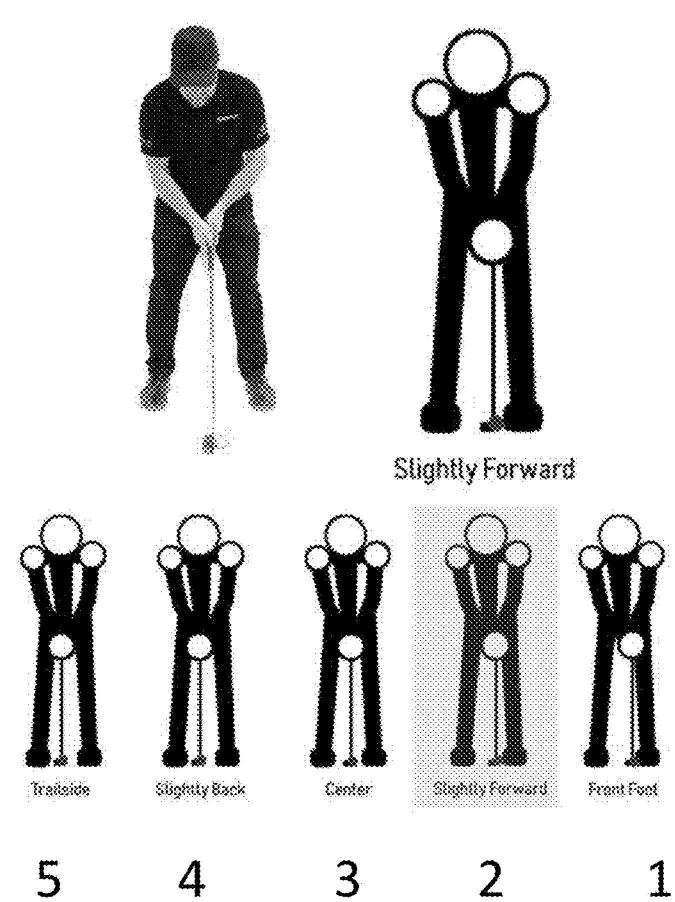
= Categorise code value of $\mathbf{BP_1}$
PROCEED TO CLASSIFICATION
FIGURE 11

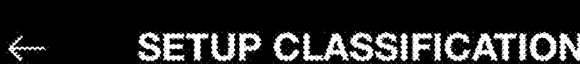
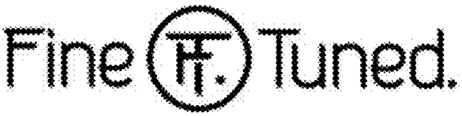
SHAFT LEAN
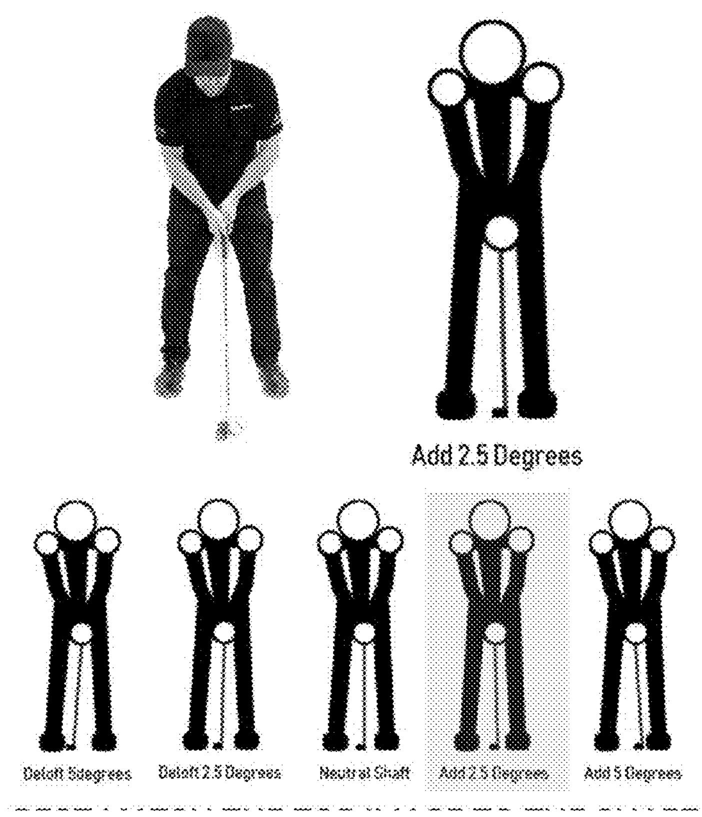
5 4 3 2 1
= Categorise code value of $\mathbf{SL_1}$
PROCEED TO CLASSIFICATION
FIGURE 12

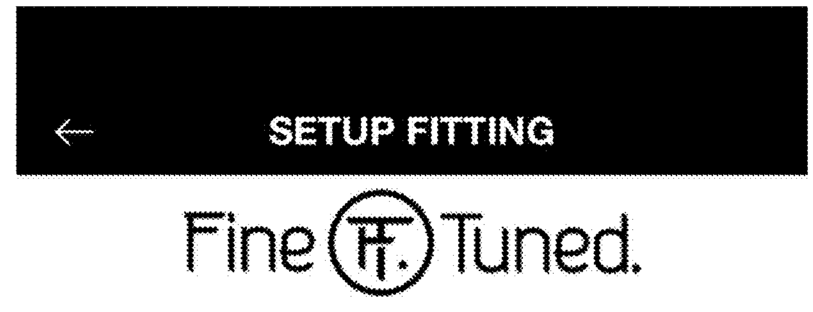
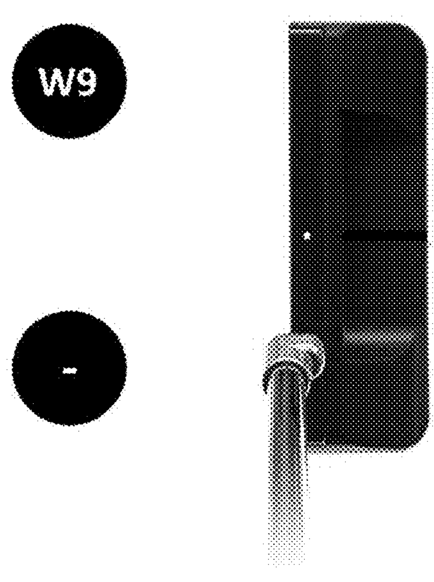
Head
SB2 Black with Black line — 13.1 (H)
Hosel
NHP (Half Offset Plumbers) — 13.2 (HO)
Length
35.25 — 13.3 (L)
Lie
70.0 degrees — 13.4 (LI)
Loft
0.5 degrees — 13.5 (LO)
Grip (Insert Grip Model)
FT midsize Pistol — 13.6 (GR)
PROCEED TO SETUP PHOTO
FIGURE 13

DYNAMIC ASSESMENT

Aim Tendancy
at Target — 14.5 ($A_2$)

Distance From The Ball
11.5" — 14.6 ($DFB_2$)

Tempo
Constant — 14.7 ($T_2$)

Stroke Direction Down The Line
at Target — 14.8 ($SD_2$)

Rate Of Rotation
(45d/s) — 14.9 ($R_2$)

Start Direction
at Target — 14.10 ($ST_2$)

Launch
Up and forward — 14.11 ($LN_2$)

PROCEED TO SETUP PHOTO

← FINE-TUNED SETUP PHOTO
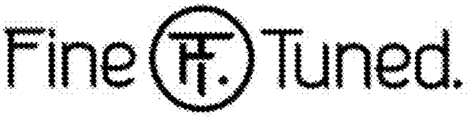
DOWN THE LINE
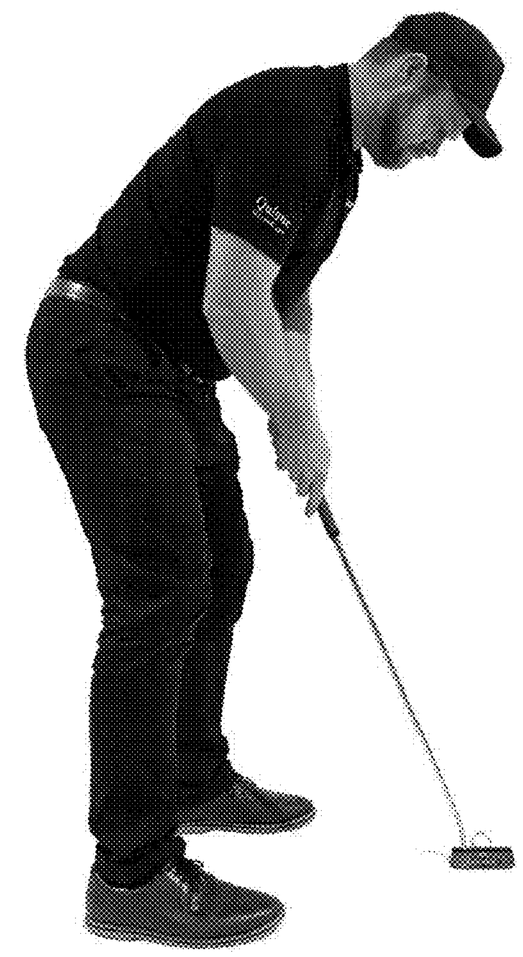
PROCEED TO CLASSIFICATION
FIGURE 15

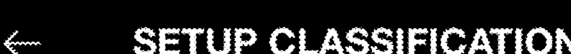
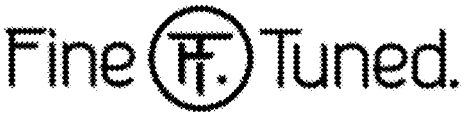
SHAFT TO FOREARM PLANE
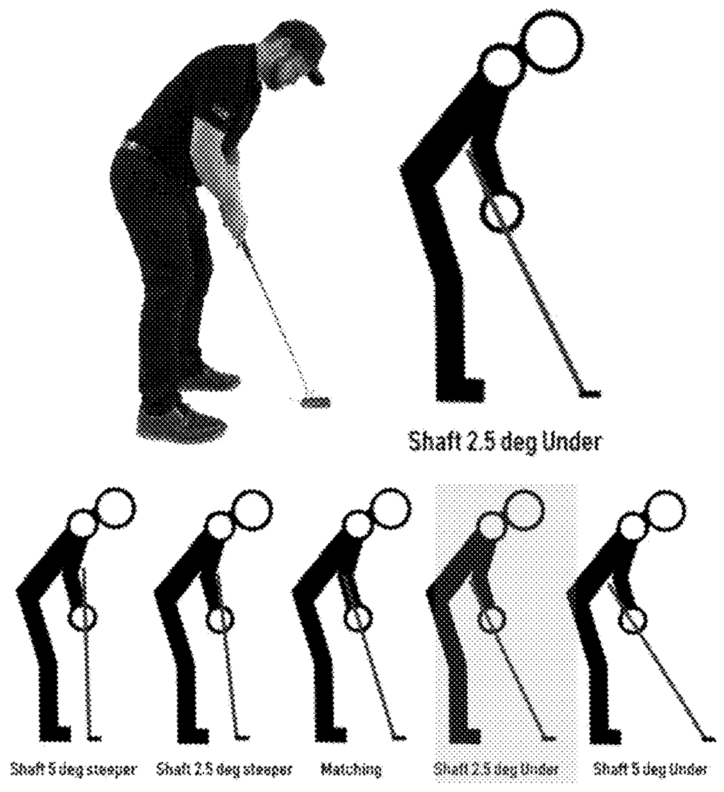
BEST MATCH THE TOP IMAGE TO THE SHAFT TO FOREARM PLANE CLASSIFICATION IMAGE ON THE BOTTOM
PROCEED TO CLASSIFICATION
FIGURE 16A

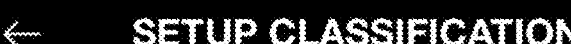
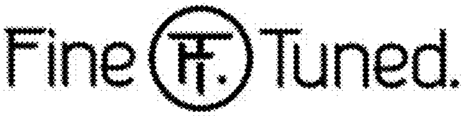
SHAFT LEAN
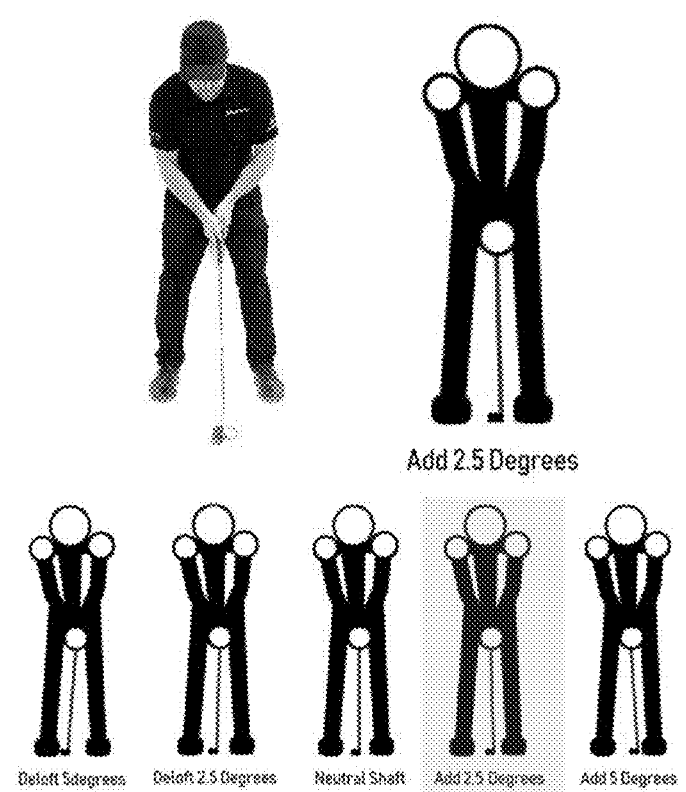
BEST MATCH THE TOP IMAGE TO THE SHAFT LEAN CLASSIFICATION IMAGE ON THE BOTTOM
PROCEED TO CLASSIFICATION
FIGURE 16B Head
SB2 Black with Black line — 17.1 (H)

Neck
NHP (Half Offset Plumbers) — 17.2 (HO)

Length
35.25 — 17.3 (L)

Lie
70.0 degrees — 17.4 (LA)

Loft
0.5 degrees — 17.5 (LO)

CLASSIFY NEW CONFIGURATION

APPROVE FITTING RESULTS

DYNAMIC ASSESEMENT

Aim Tendancy
at Target
14.5 ($A_3$)

Distance From The Ball
11.5"
14.6 ($DFB_3$)

Tempo
Constant
14.7 ($T_3$)

Stroke Direction Down The Line
at Target
14.8 ($SD_3$)

Rate Of Rotation
(45d/s)
14.9 ($R_3$)

Start Direction
at Target
14.10 ($ST_3$)

Launch
Up and forward
14.11 ($LN_3$)

CLASSIFY NEW CONFIGURATION

APPROVE FITTING RESULTS

| Fitting Details | Selection | Code Value | Source (Fi |
|---|---|---|---|
| | | | |
| Height: | 6'1 | 6'1 | 3.6 |
| WTG: | 35 | 35 | 3.7 |
| Dexterity: | Right | R | 3.8 |
| Current Putter Length: | 34 | 34 | 4.3 |
| Dominant eye: | Left | L | 4.5 |
| Current Shaft Plane Angle: | 70 | 70 | 4.4 |
| Aim Tendency: | 2 degrees Closed to target | 1 | 4.6 |
| Distance from the ball: | 10" | 10 | 4.7 |
| Tempo: | Acceleration | 3 | 4.8 |
| Stroke Direction DTL: | At Target | 3 | 4.11 |
| Face Rotation: | (60d/s) | 4 | 4.9 |
| Miss Tendancy: | 1 degrees Closed to target | 2 | 4.10 |
| Launch: | Up and forward | 2 | 4.11 |
| Hand Position: | Hands Under Shoulders | 3 | 6 |
| Shaft to Forearm plane: | Matching forearm plane | 3 | 7 |
| Eyeline: | 1" Over the ball | 2 | 8 |
| Posture angle: | 37.5 Degrees | 4 | 9 |
| Ball Position Face on: | Forward of Center | 2 | 11 |
| Shaft Lean Face on: | Add 2.5 degrees | 2 | 12 |
| | | | |
| Recommendation of Spec: from Setup fitting: | | | |
| Head: | SB2 Black with Black line | | 25 |
| Hosel: | NHP (Half Offset Plumbers) | | 23 |
| Headweight: | 350g | | 26 |
| Heel: | - | | 27 |
| Toe: | W9 | | 27 |
| Length: | 35.25 | | 21 |
| Lie: | 70 | | 22 |
| Loft: | 0.5 degrees | | 24 |
| Grip: | FT Midsize Pistol | | 14.3 |
| | | | |
| Aim Tendency: | at Target | 3 | 14.5 |
| Distance from the ball: | 11.5" | 11.5 | 14.6 |
| Tempo: | Constant | 2 | 14.7 |
| Stroke Direction DTL: | at Target | 3 | 14.8 |
| Rate of Rotation: | (45d/s) | 3 | 14.9 |
| Start direction: | at Target | 3 | 14.10 |
| Launch: | Flat then forward | 3 | 14.11 |
| Hand Position: | Hands Under Shoulders | 3 | 16 |
| Shaft to Forearm plane: | 2.5 degrees below forearm plane | 2 | 16 |
| Eyeline: | 1" Inside the ball | 4 | 16 |
| Posture angle: | 37.5 Degrees | 4 | 16 |
| Ball Position Face on: | Slightly forward | 2 | 16 |
| Shaft Lean Face on: | Neutral Shaft | 3 | 16 |

FIGURE 18

Fine Tuned.

Player Name: Peter Ranford

Fitter: Peter Ranford

Date: January 11, 2021

Email: peter@fine-tuned.co.nz

Head: SB2 Black with Black Line

Neck: NHP (Half Offset Plumbers)

Length: 35.25"

Lie: 70.0

Loft: 0.5 degrees

Grip: FT Midsize Pistol

Head weight: 350g

Customisations

Fine Tuned

Congratulations for completing your Fine-Tuned fitting session and taking the essential steps towards becoming a better putter. Below are the highlights of the adjustments required to perform to your potential.

PRE - TUNING

Putter Model: Flow neck blade
Putter Type: Blade
Putter Length: 34
Distance from the ball: 10″
Tempo: Acceleration
Current Shaft Plane angle: 70
Aim Tendency: 2 degrees closed to target
Stroke Direction: at Target
Rate of Rotation: (60d/s)

FINE-TUNED

Putter Model: SB2 Black with Black Line
Putter Type: Blade
Putter Length: 35.25″
Distance from ball: 11.5″
Tempo: Constant
Current Shaft Plane angle: 70
Aim Tendency: at Target
Stroke Direction: at Target
Rate of Rotation: (45d/s)

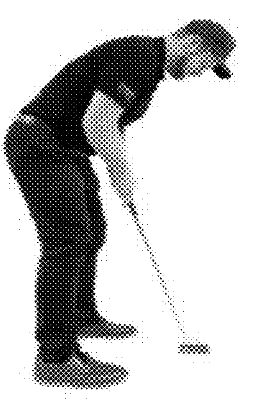
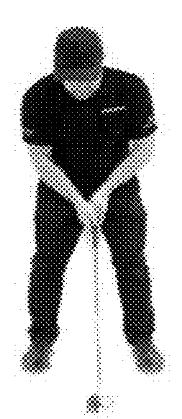
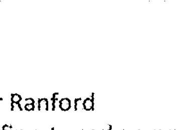
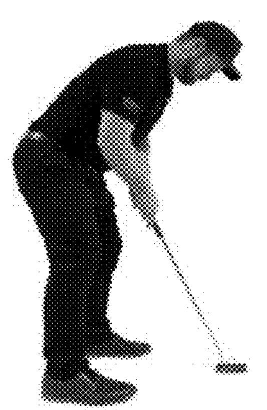
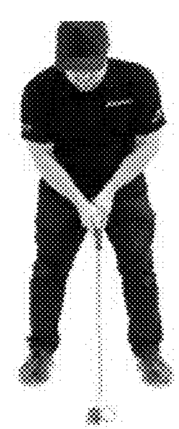

Sender Name: Peter Ranford
Sender Email: info@fine-tuned.co.nz
Player Name: Peter Ranford
Email: peter@fine-tuned.co.nz
Phone: 021258430
Handicap: 0
Height: 6′1″
WTG: 35″
Head: SB2 Black with Black Line
Neck: NHP (Half Offset Plumbers)
Heel: -
Toe: W9
Length: 35.25″
Lie: 70.0
Loft: 0.5 degrees
Grip: FT Midsize Pistol
Head weight: 350g
Customisations:

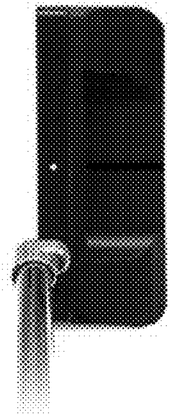

We look forward to bringing you the best of your putting, by optimizing your SETUP, STROKE, STRIKE and ROLL.

The best is yet to come ...

Kind regards, Fine Tuned

FIGURE 20

Publishes value (L) in Fig 13.3 and then again in 17.3

| Length | (L) | (1st recommendation) | | | | | | | | |
|---|---|---|---|---|---|---|---|---|---|---|
| The initial Length (L) recommendation of a putter is determined from the following: | | | | | | | | | | |
| WTG | = | The players measured Wrist To Ground measurment in inches | | | | | | | | Fig. 3.7 |
| CPL | = | The players current putter length. | | | | | | | | Fig 4.3 |
| $E_1$ | = | The players eyeline relative to the ball position from down the line | | | | | | | | Fig. 8 |
| $SP_1$ | = | The players shaft plane relative to forearms | | | | | | | | Fig.7 |
| $A_1$ | = | The players Aim tendency | | | | | | | | Fig. 4 (4.6) |
| | | | | | | | | | | |
| L | (Length of Putter) | | = | ( | x | + | $L_1$ | ) | | |
| x | = | (WTG | + | CPL) | | ÷ | 2 | | | |
| | (Wrist to Ground) | | | (Current Putter Length) | | | | | | |
| | | Fig. 3.7 | | Fig 4.3 | | | | | | |
| Working example values | | 35" | + | 34" | ÷ | 2 | = | | 34.5" | |
| | | | | | | | | | | |
| $L_1$ | = | $E_1$ | + | $SP_1$ | + | $A_1$ | = | value in corresponding $L_1$ column in Fig. 21 | | |
| | | (Eyeline) | | (Shaft plane Angle) | | (Aim Tendency) | | | | |
| | | Fig. 8 | | Fig.7 | | Fig. 4 (4.6) | | | | |
| | | 2 | + | 3 | + | 1 | = | 0.75" | | |
| | | | | | | | | | | |
| L | = | ( | x | + | $L_1$ | ) | | | | |
| Working example values | | ( | 34.5 | + | 0.75 | ) | = | 35.25 | | |
| | | | | | | | | | | |
| L | = | 35.25" | | | | | | | | |

| | Beyond | | Ball Position | | Inside |
|---|---|---|---|---|---|
| $E_1$ | | 1 | 2 | 3 | 4 | 5 |
| Inch | 2" | 1" | 0" | 1" | 2" |
| | Under | Shaft to forearm plane | | | Over |
| $SP_1$ | 1 | 2 | 3 | 4 | 5 |
| Deg | 5 | 2.5 | 0 | 2.5 | 5 |
| | L | | Aim | | R |
| $A_1$ | 1 | 2 | 3 | 4 | 5 |
| Deg | 2 | 1 | 0 | 1 | 2 |

| $E_1$+ $SP_1$+ $A_1$ | | $E_1$+ $SP_1$+ $A_1$ | | $E_1$+ $SP_1$+ $A_1$ | | $E_1$+ $SP_1$+ $A_1$ | | $E_1$+ $SP_1$+ $A_1$ | |
|---|---|---|---|---|---|---|---|---|---|
| Code | Length ($L_1$) | Code | Length ($L_1$) | Code | Length ($L_1$) | Code | Length ($L_1$) | Code | Length ($L_1$) |
| 1+1+1 | 1 | 2+1+1 | 1 | 3+1+1 | 1 | 4+1+1 | 1 | 5+1+1 | 1 |
| 1+2+1 | 1 | 2+2+1 | 1 | 3+2+1 | 1 | 4+2+1 | 1 | 5+2+1 | 1 |
| 1+3+1 | 0.75 | 2+3+1 | 0.75 | 3+3+1 | 0.75 | 4+3+1 | 0.75 | 5+3+1 | 0.75 |
| 1+4+1 | 0.75 | 2+4+1 | 0.75 | 3+4+1 | 0.75 | 4+4+1 | 0.75 | 5+4+1 | 0.75 |
| 1+5+1 | 0.75 | 2+5+1 | 0.75 | 3+5+1 | 0.75 | 4+5+1 | 0.75 | 5+5+1 | 0.75 |
| 1+1+2 | 0.50 | 2+1+2 | 0.50 | 3+1+2 | 0.50 | 4+1+2 | 0.50 | 5+1+2 | 0.50 |
| 1+2+2 | 0.50 | 2+2+2 | 0.50 | 3+2+2 | 0.50 | 4+2+2 | 0.50 | 5+2+2 | 0.50 |
| 1+3+2 | 0.50 | 2+3+2 | 0.50 | 3+3+2 | 0.50 | 4+3+2 | 0.50 | 5+3+2 | 0.50 |
| 1+4+2 | 0.25 | 2+4+2 | 0.25 | 3+4+2 | 0.25 | 4+4+2 | 0.25 | 5+4+2 | 0.25 |
| 1+5+2 | 0.25 | 2+5+2 | 0.25 | 3+5+2 | 0.25 | 4+5+2 | 0.25 | 5+5+2 | 0.25 |
| 1+1+3 | 0 | 2+1+3 | 0 | 3+1+3 | 0 | 4+1+3 | 0 | 5+1+3 | 0 |
| 1+2+3 | 0 | 2+2+3 | 0 | 3+2+3 | 0 | 4+2+3 | 0 | 5+2+3 | 0 |
| 1+3+3 | 0 | 2+3+3 | 0 | 3+3+3 | 0 | 4+3+3 | 0 | 5+3+3 | 0 |
| 1+4+3 | 0 | 2+4+3 | 0 | 3+4+3 | 0 | 4+4+3 | 0 | 5+4+3 | 0 |
| 1+5+3 | 0 | 2+5+3 | 0 | 3+5+3 | 0 | 4+5+3 | 0 | 5+5+3 | 0 |
| 1+1+4 | -0.25 | 2+1+4 | -0.25 | 3+1+4 | -0.25 | 4+1+4 | -0.25 | 5+1+4 | -0.25 |
| 1+2+4 | -0.25 | 2+2+4 | -0.25 | 3+2+4 | -0.25 | 4+2+4 | -0.25 | 5+2+4 | -0.25 |
| 1+3+4 | -0.5 | 2+3+4 | -0.5 | 3+3+4 | -0.5 | 4+3+4 | -0.5 | 5+3+4 | -0.5 |
| 1+4+4 | -0.5 | 2+4+4 | -0.5 | 3+4+4 | -0.5 | 4+4+4 | -0.5 | 5+4+4 | -0.5 |
| 1+5+4 | -0.5 | 2+5+4 | -0.5 | 3+5+4 | -0.5 | 4+5+4 | -0.5 | 5+5+4 | -0.5 |
| 1+1+5 | -0.75 | 2+1+5 | -0.75 | 3+1+5 | -0.75 | 4+1+5 | -0.75 | 5+1+5 | -0.75 |
| 1+2+5 | -0.75 | 2+2+5 | -0.75 | 3+2+5 | -0.75 | 4+2+5 | -0.75 | 5+2+5 | -0.75 |
| 1+3+5 | -0.75 | 2+3+5 | -0.75 | 3+3+5 | -0.75 | 4+3+5 | -0.75 | 5+3+5 | -0.75 |
| 1+4+5 | -1 | 2+4+5 | -1 | 3+4+5 | -1 | 4+4+5 | -1 | 5+4+5 | -1 |
| 1+5+5 | -1 | 2+5+5 | -1 | 3+5+5 | -1 | 4+5+5 | -1 | 5+5+5 | -1 |

FIGURE 21

Publishes value (LA) in Fig 13.4 and then again in 17.4

| Lie | (LA) | (1st recommendation) | | | | | |
|---|---|---|---|---|---|---|---|
| The initial Lie Angle (LA) recommendation of a putter is determined from the following: | | | | | | | |
| CSP | = | The players current shaft plane at setup | | | | | |
| $LA_1$ | = | The Lie angle adjustment required from the current shaft plane | | | | | |
| $E_1$ | = | The players eyeline relative to the ball position from down the line | | | | | |
| $SP_1$ | = | The players shaft plane relative to forearms | | | | | |
| $A_1$ | = | The players Aim tendency | | | | | |
| | | | | | | | |
| LA | (Lie Angle of Putter) | = | CSP | + | $LA_1$ | | |
| | | | (Current Shaft Plane) | | (Lie Angle code) | | |
| | | | Fig 4 (4.4) | | Fig 21 | | |
| Working example values | | | 70 | | 0 | | |
| | | | | | | | |
| $LA_1$ | = | $E_1$ | + | $SP_1$ | + | $A_1$ | = value in corresponding $LA_1$ column in Fig. 22 |
| | | (Eyeline) | | (Shaft plane Angle) | | (Aim Tendency) | |
| | | Fig. 8 | | Fig.7 | | Fig. 4 (4.6) | |
| Working example values | | 2 | | 3 | | 1 = | 0 |

| | | Beyond | Ball Position | | | Inside |
|---|---|---|---|---|---|---|
| $E_1$ | | 1 | 2 | 3 | 4 | 5 |
| | Inch | 2" | 1" | 0" | 1" | 2" |
| | | Under | Shaft to forearm plane | | | Over |
| $SP_1$ | | 1 | 2 | 3 | 4 | 5 |
| | Deg | 5 | 2.5 | 0 | 2.5 | 5 |
| | | L | | Aim | | R |
| $A_1$ | | 1 | 2 | 3 | 4 | 5 |
| | Deg | 2 | 1 | 0 | 1 | 2 |

| $E_1$+ $SP_1$+ $A_1$ | | $E_1$+ $SP_1$+ $A_1$ | | $E_1$+ $SP_1$+ $A_1$ | | $E_1$+ $SP_1$+ $A_1$ | | $E_1$+ $SP_1$+ $A_1$ | |
|---|---|---|---|---|---|---|---|---|---|
| Code | Lie ($LA_1$) | Code | Lie ($LA_1$) | Code | Lie ($LA_1$) | Code | Lie ($LA_1$) | Code | Lie ($LA_1$) |
| 1+1+1 | 2 | 2+1+1 | 2 | 3+1+1 | 2 | 4+1+1 | 2 | 5+1+1 | 2 |
| 1+2+1 | 1 | 2+2+1 | 1 | 3+2+1 | 1 | 4+2+1 | 1 | 5+2+1 | 1 |
| 1+3+1 | 0 | 2+3+1 | 0 | 3+3+1 | 0 | 4+3+1 | 0 | 5+3+1 | 0 |
| 1+4+1 | -1 | 2+4+1 | -1 | 3+4+1 | -1 | 4+4+1 | -1 | 5+4+1 | -1 |
| 1+5+1 | -2 | 2+5+1 | -2 | 3+5+1 | -2 | 4+5+1 | -2 | 5+5+1 | -2 |
| 1+1+2 | 2 | 2+1+2 | 2 | 3+1+2 | 2 | 4+1+2 | 2 | 5+1+2 | 2 |
| 1+2+2 | 1 | 2+2+2 | 1 | 3+2+2 | 1 | 4+2+2 | 1 | 5+2+2 | 1 |
| 1+3+2 | 0 | 2+3+2 | 0 | 3+3+2 | 0 | 4+3+2 | 0 | 5+3+2 | 0 |
| 1+4+2 | -1 | 2+4+2 | -1 | 3+4+2 | -1 | 4+4+2 | -1 | 5+4+2 | -1 |
| 1+5+2 | -2 | 2+5+2 | -2 | 3+5+2 | -2 | 4+5+2 | -2 | 5+5+2 | -2 |
| 1+1+3 | 2 | 2+1+3 | 2 | 3+1+3 | 2 | 4+1+3 | 2 | 5+1+3 | 2 |
| 1+2+3 | 1 | 2+2+3 | 1 | 3+2+3 | 1 | 4+2+3 | 1 | 5+2+3 | 1 |
| 1+3+3 | 0 | 2+3+3 | 0 | 3+3+3 | 0 | 4+3+3 | 0 | 5+3+3 | 0 |
| 1+4+3 | -1 | 2+4+3 | -1 | 3+4+3 | -1 | 4+4+3 | -1 | 5+4+3 | -1 |
| 1+5+3 | -2 | 2+5+3 | -2 | 3+5+3 | -2 | 4+5+3 | -2 | 5+5+3 | -2 |
| 1+1+4 | 2 | 2+1+4 | 2 | 3+1+4 | 2 | 4+1+4 | 2 | 5+1+4 | 2 |
| 1+2+4 | 1 | 2+2+4 | 1 | 3+2+4 | 1 | 4+2+4 | 1 | 5+2+4 | 1 |
| 1+3+4 | 0 | 2+3+4 | 0 | 3+3+4 | 0 | 4+3+4 | 0 | 5+3+4 | 0 |
| 1+4+4 | -1 | 2+4+4 | -1 | 3+4+4 | -1 | 4+4+4 | -1 | 5+4+4 | -1 |
| 1+5+4 | -2 | 2+5+4 | -2 | 3+5+4 | -2 | 4+5+4 | -2 | 5+5+4 | -2 |
| 1+1+5 | 2 | 2+1+5 | 2 | 3+1+5 | 2 | 4+1+5 | 2 | 5+1+5 | 2 |
| 1+2+5 | 1 | 2+2+5 | 1 | 3+2+5 | 1 | 4+2+5 | 1 | 5+2+5 | 1 |
| 1+3+5 | 0 | 2+3+5 | 0 | 3+3+5 | 0 | 4+3+5 | 0 | 5+3+5 | 0 |
| 1+4+5 | -1 | 2+4+5 | -1 | 3+4+5 | -1 | 4+4+5 | -1 | 5+4+5 | -1 |
| 1+5+5 | -2 | 2+5+5 | -2 | 3+5+5 | -2 | 4+5+5 | -2 | 5+5+5 | -2 |

FIGURE 22

Publishes value (HO) in Fig 13.2 and then again in 17.2

| **Hosel** | (HO) | (1st recommendation) | | | | | | |
|---|---|---|---|---|---|---|---|---|
| The initial Hosel (HO) recommendation of a putter is determined from the following: | | | | | | | | |
| $M_1$ | = | The players Miss tendency relative to target line | | | | | (Fig 4.10) | |
| $A_1$ | = | The players Aim tendency | | | | | (Fig 4.6) | |
| $R_1$ | = | The players rate of rotation of the putter | | | | | (Fig 4.9) | |
| | | | | | | | | |
| HO | = | $M_1$ | + | $A_1$ | + | $R_1$ | | |
| | | (Miss Tendency) | | (Aim Tendency) | | (Rate of Rotation) | (The Hosel of the coordinates in Fig. 24) | |
| Working example values | | 2 | + | 1 | + | 4 | = | NPH |

| | | L | | Miss Tendency | | R |
|---|---|---|---|---|---|---|
| $M_1$ | | 1 | 2 | 3 | 4 | 5 |
| | Deg | 2 | 1 | 0 | 1 | 2 |
| | | L | | Aim | | R |
| $A_1$ | | 1 | 2 | 3 | 4 | 5 |
| | Deg | 2 | 1 | 0 | 1 | 2 |
| | | Passive | | Rate of Rotation | | Active |
| $R_1$ | | 1 | 2 | 3 | 4 | 5 |
| | D/S | <15 | 30 | 45 | 60 | >75 |

| Key for neck/hosel recommendations: | |
|---|---|
| **CS** | Centershaft |
| **NDB** | Double Bend Neck |
| **NPF** | Full Offset Plumbers Neck |
| **NPH** | Half Offset Plumbers Neck |
| **NHBH** | Half Offset Flow Neck |
| **NHBF** | Full Offset Flow Neck |

| $M_1$+ A1 + $R_1$ | | $M_1$+ A1 + $R_1$ | | $M_1$+ A1 + $R_1$ | | $M_1$+ A1 + $R_1$ | | $M_1$+ A1 + $R_1$ | |
|---|---|---|---|---|---|---|---|---|---|
| Code | Hosel | Code | Hosel | Code | Hosel | Code | Hosel | Code | Hosel |
| 1+1+1 | CS | 2+1+1 | CS | 3+1+1 | CS | 4+1+1 | NDB | 5+1+1 | NDB |
| 1+2+1 | CS | 2+2+1 | CS | 3+2+1 | CS | 4+2+1 | NDB | 5+2+1 | NDB |
| 1+3+1 | CS | 2+3+1 | CS | 3+3+1 | CS | 4+3+1 | NDB | 5+3+1 | NDB |
| 1+4+1 | CS | 2+4+1 | CS | 3+4+1 | NDB | 4+4+1 | NDB | 5+4+1 | NDB |
| 1+5+1 | CS | 2+5+1 | CS | 3+5+1 | NDB | 4+5+1 | NDB | 5+5+1 | NDB |
| 1+1+2 | CS | 2+1+2 | CS | 3+1+2 | CS | 4+1+2 | NDB | 5+1+2 | NDB |
| 1+2+2 | CS | 2+2+2 | CS | 3+2+2 | CS | 4+2+2 | NDB | 5+2+2 | NDB |
| 1+3+2 | NPH | 2+3+2 | NPH | 3+3+2 | NPF | 4+3+2 | NPF | 5+3+2 | NPF |
| 1+4+2 | NPH | 2+4+2 | NPH | 3+4+2 | NPF | 4+4+2 | NPF | 5+4+2 | NPF |
| 1+5+2 | NPH | 2+5+2 | NPH | 3+5+2 | NPF | 4+5+2 | NPF | 5+5+2 | NPF |
| 1+1+3 | NPH | 2+1+3 | NPH | 3+1+3 | NPH | 4+1+3 | NPF | 5+1+3 | NPF |
| 1+2+3 | NPH | 2+2+3 | NPH | 3+2+3 | NPH | 4+2+3 | NPF | 5+2+3 | NPF |
| 1+3+3 | NPH | 2+3+3 | NPH | 3+3+3 | NPH | 4+3+3 | NPF | 5+3+3 | NPF |
| 1+4+3 | NPH | 2+4+3 | NPH | 3+4+3 | NPF | 4+4+3 | NPF | 5+4+3 | NPF |
| 1+5+3 | NPH | 2+5+3 | NPH | 3+5+3 | NPF | 4+5+3 | NPF | 5+5+3 | NPF |
| 1+1+4 | NPH | 2+1+4 | NPH | 3+1+4 | NHBH | 4+1+4 | NPF | 5+1+4 | NPF |
| 1+2+4 | NPH | 2+2+4 | NPH | 3+2+4 | NHBH | 4+2+4 | NPF | 5+2+4 | NPF |
| 1+3+4 | NPH | 2+3+4 | NPH | 3+3+4 | NHBF | 4+3+4 | NPF | 5+3+4 | NPF |
| 1+4+4 | NHBH | 2+4+4 | NHBH | 3+4+4 | NHBF | 4+4+4 | NHBF | 5+4+4 | NHBF |
| 1+5+4 | NHBH | 2+5+4 | NHBH | 3+5+4 | NHBF | 4+5+4 | NHBF | 5+5+4 | NHBF |
| 1+1+5 | NHBH | 2+1+5 | NHBH | 3+1+5 | NHBH | 4+1+5 | NHBF | 5+1+5 | NHBF |
| 1+2+5 | NHBH | 2+2+5 | NHBH | 3+2+5 | NHBH | 4+2+5 | NHBF | 5+2+5 | NHBF |
| 1+3+5 | NHBH | 2+3+5 | NHBH | 3+3+5 | NHBF | 4+3+5 | NHBF | 5+3+5 | NHBF |
| 1+4+5 | NHBH | 2+4+5 | NHBH | 3+4+5 | NHBF | 4+4+5 | NHBF | 5+4+5 | NHBF |
| 1+5+5 | NHBH | 2+5+5 | NHBH | 3+5+5 | NHBF | 4+5+5 | NHBF | 5+5+5 | NHBF |

FIGURE 23

Publishes value (LO) in Fig

| Loft | (LO) | (1st recommendation) | | | | | |
|---|---|---|---|---|---|---|---|
| The initial Loft (LO) recommendation of a putter is determined from the following: | | | | | | | |
| $BP_1$ | = | The players Ball Position (face on) relative to stance | | | | Fig. 11 | |
| $SL_1$ | = | The players Shaft Lean (face on) relative to vertical | | | | Fig. 12 | |
| | | | | | | | |
| LO | = | $BP_1$ | + | $SL_1$ | (The degree value of the coordinates in fig. 23) | | |
| LO | | (Ball Position) | | (Shaft Lean) | | | |
| Working example value | | 2 | + | 2 | = | 0.5 | |

| | Forward | | Center | | Back |
|---|---|---|---|---|---|
| $BP_1$ | 1 | 2 | 3 | 4 | 5 |
| | Front Foot | Forward of Center | Center | Back of Center | Trailside |
| | Deloft | | Neutral | | Add loft |
| $SL_1$ | 1 | 2 | 3 | 4 | 5 |
| | Add 5 deg | Add 2.5 deg | Neutral | Deloft 2.5 deg | Deloft 5 deg |

| $BP_1$+ $SL_1$ | | $BP_1$+ $SL_1$ | | $BP_1$+ $SL_1$ | | $BP_1$+ $SL_1$ | | $BP_1$+ $SL_1$ | |
|---|---|---|---|---|---|---|---|---|---|
| Code | Loft (LO) | Code | Loft (LO) | Code | Loft (LO) | Code | Loft (LO) | Code | Loft (LO) |
| 1+5 | 3 | 1+4 | 2 | 1+3 | 1 | 1+2 | 0 | 1+1 | 0 |
| 2+5 | 3.5 | 2+4 | 2.5 | 2+3 | 1.5 | 2+2 | 0.5 | 2+1 | 0 |
| 3+5 | 4 | 3+4 | 3 | 3+3 | 2 | 3+2 | 1 | 3+1 | 0 |
| 4+5 | 4.5 | 4+4 | 3.5 | 4+3 | 2.5 | 4+2 | 1.5 | 4+1 | 0.5 |
| 5+5 | 5 | 5+4 | 4 | 5+3 | 3 | 5+2 | 2 | 5+1 | 1 |

Publishes value ($LO_2$) in Fig. 17.5

| Loft | ($LO_2$) | (2nd recommendation) | |
|---|---|---|---|
| The second loft recommendation is based on the initial recommendation (LO) then assesed dynamically. | | | |
| The selection made in the $LN_2$ tab (Fig 14.11) will then determine the adjustment below | | | |
| | | | |
| Code | Description | Adjustment to recommended loft value | |
| 1 | Up and Backspin | | -1 |
| 2 | Up then skidding | | -0.5 |
| 3 | Flat then forward | | 0 |
| 4 | Forward from Impact | | 0.5 |
| 5 | Pop and forward | | 1 |

FIGURE 24

Publishes value (H) in Fig 13.1 and again in 17.1

| Head | (H) | (1st recommendation) | | | | | | | |
|---|---|---|---|---|---|---|---|---|---|
| The initial Head (H) recommendation of a putter is determined from the following: | | | | | | | | | |
| $A_1$ | = | The players Miss tendency relative to target line | | | | | | (Fig 4.6) | |
| $R_1$ | = | The players rate of rotation of the putter | | | | | | (Fig 4.9) | |
| CPC | = | The players Current Putter Category | | | | | | (Fig 4.2) | |
| | | | | | | | | | |
| H | = | $A_1$ | + | $R_1$ | + | CPC | = | (The Head of the coordinates in Fig. 24) | |
| Working example values | | 1 | + | 4 | + | 1 | = | SB2 Black w black line | |

FIGURE 25A

| | | L | | Aim | | R |
|---|---|---|---|---|---|---|
| $A_1$ | | 1 | 2 | 3 | 4 | 5 |
| | Deg | 2 | 1 | 0 | 1 | 2 |
| | | Passive | | Rate of Rotation | | Active |
| $R_1$ | | 1 | 2 | 3 | 4 | 5 |
| | D/S | <15 | 30 | 45 | 60 | >75 |
| | | | | Current Putter Category | | |
| CPC | | 1 | 2 | 3 | 4 | 5 |
| | Putter Category | Blade | Wide Blade | Mid - Mallet | Mallet | Fang |

FIGURE 25B

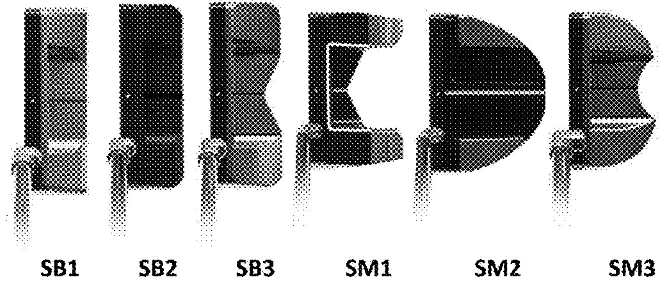

FIGURE 25C

| A1 + R1 + CPC | | A1 + R1 + CPC | | A1 + R1 + CPC | | $A_1 + R_1$ + CPC | | $A_1 + R_1$ + CPC | |
|---|---|---|---|---|---|---|---|---|---|
| Code | $H_1$ Spec | Code | H1 Spec | Code | $H_1$ Spec | Code | $H_1$ Spec | Code | $H_1$ Spec |
| 1+1+1 | SB2 Black w black line | 2+1+1 | SB1 Black w black line | 3+1+1 | SB2 Nickel w black line | 4+1+1 | SB1 Nickel w Black line | 5+1+1 | SB3 Nickel w Black Lines |
| 1+1+2 | SB1 Black w black line | 2+1+2 | SB3 Black w black line | 3+1+2 | SB3 Nickel w black lines | 4+1+2 | SB3 Nickel w black lines | 5+1+2 | SM3 Nickel w Black lines |
| 1+1+3 | SB3 Black w black line | 2+1+3 | SM3 Black w black line | 3+1+3 | SM3 Nickel w black lines | 4+1+3 | SM3 Nickel w black lines | 5+1+3 | SM2 Two Tone |
| 1+1+4 | SM3 Black w black line | 2+1+4 | SM2 w black line | 3+1+4 | SM2 Black w white line | 4+1+4 | SM2 Two Tone | 5+1+4 | SM2 Two Tone |
| 1+1+5 | SM3 Black w black line | 2+1+5 | SM1 Black w white center line | 3+1+5 | SM1 Black w white lines | 4+1+5 | SM1 Black w White line | 5+1+5 | SM1 Two Tone |
| 1+2+1 | SB2 Black w black line | 2+2+1 | SB1 Black w black line | 3+2+1 | SB2 Nickel w black line | 4+2+1 | SB1 Nickel w Black line | 5+2+1 | SB3 Nickel w Black Lines |
| 1+2+2 | SB1 Black w black line | 2+2+2 | SB3 Black w black line | 3+2+2 | SB3 Nickel w black lines | 4+2+2 | SB3 Nickel w black lines | 5+2+2 | SM3 Nickel w Black lines |
| 1+2+3 | SB3 Black w black line | 2+2+3 | SM3 Black w black line | 3+2+3 | SM3 Nickel w black lines | 4+2+3 | SM3 Nickel w black lines | 5+2+3 | SM2 Two Tone |
| 1+2+4 | SM3 Black w black line | 2+2+4 | SM2 w black line | 3+2+4 | SM2 Black w white line | 4+2+4 | SM2 Two Tone | 5+2+4 | SM2 Two Tone |
| 1+2+5 | SM3 Black w black line | 2+2+5 | SM1 Black w white center line | 3+2+5 | SM1 Black w white lines | 4+2+5 | SM1 Black w White line | 5+2+5 | SM1 Two Tone |
| 1+3+1 | SB2 Black w black line | 2+3+1 | SB1 Black w black line | 3+3+1 | SB2 Nickel w black line | 4+3+1 | SB1 Nickel w Black line | 5+3+1 | SB3 Nickel w Black Lines |
| 1+3+2 | SB1 Black w black line | 2+3+2 | SB3 Black w black line | 3+3+2 | SB3 Nickel w black lines | 4+3+2 | SB3 Nickel w black lines | 5+3+2 | SM3 Nickel w Black lines |
| 1+3+3 | SB3 Black w black line | 2+3+3 | SM3 Black w black line | 3+3+3 | SM3 Nickel w black lines | 4+3+3 | SM3 Nickel w black lines | 5+3+3 | SM2 Two Tone |
| 1+3+4 | SM3 Black w black line | 2+3+4 | SM2 w black line | 3+3+4 | SM2 Black w white line | 4+3+4 | SM2 Two Tone | 5+3+4 | SM2 Two Tone |
| 1+3+5 | SM3 Black w black line | 2+3+5 | SM1 Black w white center line | 3+3+5 | SM1 Black w white lines | 4+3+5 | SM1 Black w White line | 5+3+5 | SM1 Two Tone |
| 1+4+1 | SB2 Black w black line | 2+4+1 | SB1 Black w black line | 3+4+1 | SB2 Nickel w black line | 4+4+1 | SB1 Nickel w Black line | 5+4+1 | SB3 Nickel w Black Lines |
| 1+4+2 | SB1 Black w black line | 2+4+2 | SB3 Black w black line | 3+4+2 | SB3 Nickel w black lines | 4+4+2 | SB3 Nickel w black lines | 5+4+2 | SM3 Nickel w Black lines |
| 1+4+3 | SB3 Black w black line | 2+4+3 | SM3 Black w black line | 3+4+3 | SM3 Nickel w black lines | 4+4+3 | SM3 Nickel w black lines | 5+4+3 | SM2 Two Tone |
| 1+4+4 | SM3 Black w black line | 2+4+4 | SM2 w black line | 3+4+4 | SM2 Black w white line | 4+4+4 | SM2 Two Tone | 5+4+4 | SM2 Two Tone |
| 1+4+5 | SM3 Black w black line | 2+4+5 | SM1 Black w white center line | 3+4+5 | SM1 Black w white lines | 4+4+5 | SM1 Black w White line | 5+4+5 | SM1 Two Tone |
| 1+5+1 | SB2 Black w black line | 2+5+1 | SB1 Black w black line | 3+5+1 | SB2 Nickel w black line | 4+5+1 | SB1 Nickel w Black line | 5+5+1 | SB3 Nickel w Black Lines |
| 1+5+2 | SB1 Black w black line | 2+5+2 | SB3 Black w black line | 3+5+2 | SB3 Nickel w black lines | 4+5+2 | SB3 Nickel w black lines | 5+5+2 | SM3 Nickel w Black lines |
| 1+5+3 | SB3 Black w black line | 2+5+3 | SM3 Black w black line | 3+5+3 | SM3 Nickel w black lines | 4+5+3 | SM3 Nickel w black lines | 5+5+3 | SM2 Two Tone |
| 1+5+4 | SM3 Black w black line | 2+5+4 | SM2 w black line | 3+5+4 | SM2 Black w white line | 4+5+4 | SM2 Two Tone | 5+5+4 | SM2 Two Tone |
| 1+5+5 | SM3 Black w black line | 2+5+5 | SM1 Black w white center line | 3+5+5 | SM1 Black w white lines | 4+5+5 | SM1 Black w White line | 5+5+5 | SM1 Two Tone |

FIGURE 25D

Publishes value (HW) in Fig 14.4 and again in 17.7

| **Headweight (HW)** | | | (1st recommendation) | | | | | | |
|---|---|---|---|---|---|---|---|---|---|
| The initial Headweight (HW) recommendation of a putter is determined from the following: | | | | | | | | | |
| L | = | Length | (There is a set corresponding base headweight for the putters length) | | | | | | |
| $T_1$ | = | The players tempo of which they accelerate the putter into impact | | | | | | | |
| $R_1$ | = | The players rate of rotation of the putter | | | | | | | |
| | | | | | | | | | |
| HW | = | L | + | ( $T_1$ | + | $R_1$ ) | | | |
| | Length (Corresponding weight) | | | | | | | | |
| Working example values | | 350g | + | ( 3 | + | 4 ) | = | 0 | |
| | | | | | | | | | |
| | | | | | | | | | |
| Length | Starting Weight | | | | | | | | |
| <33" | = | 370g | | | | | | | |
| <34" >35" | = | 360g | | | | | | | |
| <35" >36" | = | 350g | Working example values | | | L = 35.25" | | | |
| <36" >37" | = | 340g | | | | | | | |
| >37" | = | 330g | | | | | | | |
| | | | | | | | | | |
| HW | = | 350g | + | 0 | = | 350g | | | |

| | | Slow | | Tempo | | Fast |
|---|---|---|---|---|---|---|
| $T_1$ | | 1 | 2 | 3 | 4 | 5 |
| | Tempo | Deceleration | Constant | Aceleration | rm Acelerati | card aceleration |
| | | Passive | | Rate of Rotation | | Active |
| $R_1$ | | 1 | 2 | 3 | 4 | 5 |
| | D/S | <15 | 30 | 45 | 60 | >75 |

| $T_1+R_1$ | HW | $T_1+R_1$ | HW | $T_1+R_1$ | HW | $T_1+R_1$ | HW | $T_1+R_1$ | HW |
|---|---|---|---|---|---|---|---|---|---|
| 1+5 | 20 | 1+4 | 20 | 1+3 | 20 | 1+2 | 20 | 1+1 | 20 |
| 2+5 | 10 | 2+4 | 10 | 2+3 | 10 | 2+2 | 10 | 2+1 | 10 |
| 3+5 | 0 | 3+4 | 0 | 3+3 | 0 | 3+2 | 0 | 3+1 | 0 |
| 4+5 | 0 | 4+4 | 0 | 4+3 | 0 | 4+2 | -10 | 4+1 | -10 |
| 5+5 | 0 | 5+4 | 0 | 5+3 | -10 | 5+2 | -10 | 5+1 | -20 |

FIGURE 26

| Head Weight | Neck | Weight Port | |
|---|---|---|---|
| | | Heel | Toe |
| 320g | Centershaft | W3 | W3 |
| | Double Bend | - | W6 |
| 330g | Centershaft | W4 | W4 |
| | Double Bend | W1 | W7 |
| 340g | Centershaft | W6 | W6 |
| | Double Bend | W2 | W8 |
| | Flow Neck | - | W8 |
| | Plumbers | - | W8 |
| 350g | Centershaft | W7 | W7 |
| | Double Bend | W3 | W9 |
| | Flow Neck | - | W9 |
| | Plumbers | - | W9 |
| 360g | Centershaft | W8 | W8 |
| | Double Bend | W4 | W10 |
| | Flow Neck | W1 | W10 |
| | Plumbers | - | W10 |
| 370g | Centershaft | W9 | W9 |
| | Double Bend | W5 | W11 |
| | Flow Neck | W2 | W11 |
| | Plumbers | W1 | W11 |
| 380g | Centershaft | W10 | W10 |
| | Double Bend | W6 | W12 |
| | Flow Neck | W3 | W12 |
| | Plumbers | W2 | W12 |
| 390g | Centershaft | W11 | W11 |
| 400g | Centershaft | W12 | W12 |

FIGURE 27

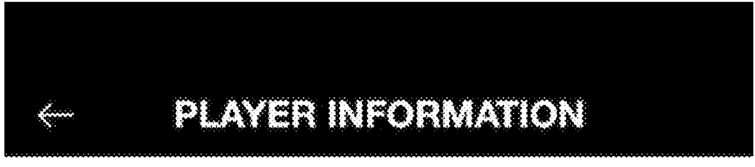
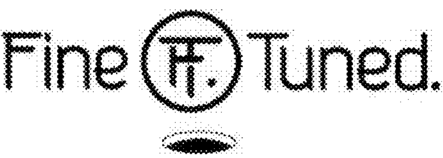
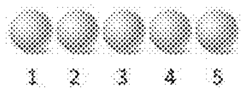
Distance From The Ball
10"
Dominant Eye
Left
Midpoint Perception
One Ball Left
PROCEED TO SETUP ANALYSIS
FIGURE 33

METHOD FOR FINE-TUNING A PUTTER AND MANUFACTURE THEREOF

TECHNICAL FIELD

Described herein is a method for fine-tuning a putter and manufacture thereof. More specifically, an application (App) that is utilised for static and dynamic data point analysis along with algorithms to best determine how attributes of a putter need to be set up to maximise consistency of a user's putter stroke and roll of the ball. A customised putter is tailored and manufactured for each individual based on the output data of the App and a fitting system of the putter is multi-adjustable therein.

BACKGROUND ART

In a modern world, more and more consumer products are being customised to the individual to better fit the task at hand. This is becoming more prevalent and commercially viable as technology continues to improve at a rapid rate. Rather than a 'one size fits all' approach, individuals in the pursuit of better performance and results have shifted towards 'finding the best fit' for themselves. For example, in the golf equipment industry, manufacturers currently offer their customers various fitting applications to improve their equipment selection. By tailoring the equipment to the individual golfer's swing type, skill level, and the like, the individual golfer knows that he or she is being given the best opportunity to succeed on the course.

Available customisation techniques and tools are, however, somewhat limited in that they are used primarily for analysis of what the club is doing based on a gyro measurement or sensor. These techniques do not lead to a specific fitting process or customised fitting system. For example, Ping Golf have developed the 'iPING™' putting App that is engineered to focus on measurables of a user's putting stroke and improve their consistency through the App's features comprising; putting handicap, putting practice and the use of an iPING™ cradle. The Putting Handicap (PHcp) function analyses a series of five putts to determine a consistency score, which equates to a handicap patterned after the traditional handicap system (lower is better). Each five-putt session is stored for comparison as the user challenges themselves to lower their PHcp. After a session based on the user's PHcp, PING offers a recommendation for the type of putter that will fit the user's stroke type (straight, slight arc, or strong arc) and also suggests the proper lie angle and loft. In practice mode, a user can also isolate one aspect of their putting that is lacking in consistency such as tempo and closing angle (the amount the clubface is open or closed at impact). The iPING™ App works in conjunction with an iPING™ cradle, which holds the user's mobile device and clips onto the putter shaft just below the grip.

However, there are several disadvantages associated with the above App. Firstly, it is reliant on the user having the technology and even though it uses measurements to analyse and recommend equipment, it is only analysing the club's movement and has no input about the player's static or other tendencies.

Furthermore, the PING App uses an iPING™ cradle, which as above holds the user's mobile device and clips onto the putter shaft below the grip. This device/cradle makes the putter heavier and affects the overall feel of the putter in use.

Srixon Golf have developed an App called the Z Swing Analyzer™ which is linked to a Swingbyte® sensor. With each swing, the App's proprietary formula analyses more than 12 key variables, such as swing path, efficiency, impact angle and attack angle. Although the Srixon App uses the integration of a sensor to measure, analyse and recommend equipment, as aforementioned it only analyses club movement and has no input about the player's static or tendencies.

TaylorMade Golf have developed an interactive putter and App with real-time stroke analytics that includes a BLAST Motion Sensor housed within the grip. The App automatically syncs stroke data directly to a mobile app, so a user can analyse metrics and refine their putting. However, the TaylorMade interactive is primarily a technique based for player improvement and does not utilise the data to assist a club fitter to recommend products.

From the above, it can be seen that there is a requirement for an App based on analysis of technique, static positions, dynamic moment that not only measures the player themselves, but records vital information about the club fitting process for recommendation and manufacture of customised/tailored equipment thereof and how players react to the given equipment specification and/or at least provides the public with a useful choice.

Further aspects and advantages of the methods, apparatus and manufacture thereof will become apparent from the ensuing description that is given by way of example only.

SUMMARY

Described herein is a method for fine-tuning a putter and manufacture thereof. More specifically, an application (App) that is utilised for static and dynamic data point analysis along with algorithms to best determine how attributes of a putter need to be set up to maximise consistency of a user's putter stroke and roll of the ball. A customised putter is tailored and manufactured for each individual based on the output data of the App and a fitting system of the putter is multi-adjustable therein.

In a first aspect there is provided a method for fine-tuning a putter comprising the steps of:

a) inputting user data into an App;
b) collecting further data obtained from measuring static and dynamic movements obtained from preferably a high speed camera and computer analysis and/or other measured variables obtained from optional sensors;
c) packaging and collating the data within the App;
d) outputting the data; and
e) analysing and applying at least one algorithm to the data set to best determine how attributes of the putter correlate to predetermined algorithmic values for putter set up to maximise consistency of a user's stroke and roll of ball while putting and for determining the correct specification of a user's putter.

In a second aspect there is provided a fine-tuned or customised putter manufactured for each individual based on the output data of the App and method as described herein.

In a third aspect there is provided a fitting system for the manufacture of a multi-adjustable putter comprising:

a shaft;
a putter head;
an adjustable and/or interchangeable striking face plate; and wherein, the adjustable/interchangeable face plate maintains the loft to sole relationship of the putter head such that the putter head remains on a neutral axis to the shaft when the loft of the striking face plate is adjusted.

Advantages of the above include an App for the collection and processing of static and dynamic data along with tendencies and attributes of a user to best determine the correct specification of their putter. The App applies and compares algorithmic values and rates them to a scale of extreme based on body and club positions and in combination with high speed camera and computer analysis can best determine how attributes of a putter need to be set up to maximise consistency of stroke and roll of the ball when putting. Based on the App data and analysis, a putter can be tailored and manufactured for each individual. The fitting system of the putter is multi-adjustable which is not only dexterity neutral i.e. to suit both left- and right-handed player, the use of an adjustable/interchangeable face plate maintains the loft to sole relationship of the putter head when the loft of the striking face plate is adjusted.

BRIEF DESCRIPTION OF THE DRAWINGS

Further aspects of the methods, apparatus and manufacture thereof will become apparent from the following description that is given by way of example only and with reference to the accompanying drawings in which:

FIG. 1 illustrates an overview flowchart of the Fine-Tuned App;

FIG. 2 illustrates an exemplary screenshot of home page 1 of the Fine-Tuned App;

FIG. 3 illustrates an exemplary screenshot of player information page 2 of the Fine-Tuned App;

FIG. 4 illustrates an exemplary screenshot of initial setup analysis page 3 of the Fine-Tuned App;

FIG. 5 illustrates an exemplary screenshot of initial setup photo page 4 of the Fine-Tuned App;

FIG. 6 illustrates an exemplary screenshot of setup classification (Hand Position) page 5 of the Fine-Tuned App;

FIG. 7 illustrates an exemplary screenshot of setup classification (Shaft to Forearm plane) page 6 of the Fine-Tuned App;

FIG. 8 illustrates an exemplary screenshot of setup classification (Eyeline) page 7 of the Fine-Tuned App;

FIG. 9 illustrates an exemplary screenshot of setup classification (Posture) page 8 of the Fine-Tuned App;

FIG. 10 illustrates an exemplary screenshot of initial set up photo (Capture Face ON image) page 9 of the Fine-Tuned App;

FIG. 11 illustrates an exemplary screenshot of setup classification (Ball position Face On) page 10 of the Fine-Tuned App;

FIG. 12 illustrates an exemplary screenshot of setup classification (Shaft lean) page 11 of the Fine-Tuned App;

FIG. 13 illustrates an exemplary screenshot of setup fitting (Head, Length and Lie) page 12 (top of screen) of the Fine-Tuned App;

FIG. 15 illustrates an exemplary screenshot of fine-tuned set up photo from Down the Line from page 13 of the Fine-Tuned App;

FIG. 16 illustrates an exemplary screenshot of fine-tuned set up photo page 14 of the Fine-Tuned App to analyse the positions again with the recommended putter configuration as performed from pages 4-11 (pages 15-21 of App);

FIG. 18 illustrates an exemplary executive summary of a user's putter fitting details and specification in CSV format;

FIG. 20 illustrates an exemplary comprehensive email summary of a user's putter fitting details and specification;

FIG. 21 illustrates an exemplary fitting algorithm (Length) for data analysis of the App;

FIG. 22 illustrates an exemplary fitting algorithm (Lie) for data analysis of the App;

FIG. 23 illustrates an exemplary fitting algorithm (Hosel) for data analysis of the App;

FIG. 24 illustrates an exemplary fitting algorithm (Loft) for data analysis of the App;

FIG. 25 illustrates an exemplary fitting algorithm (Head selection) for data analysis of the App;

FIG. 26 illustrates an exemplary fitting algorithm (Head Weight) for data analysis of the App;

FIG. 27 illustrates an exemplary chart for configuring head weight relative to hosel.

FIG. 33 illustrates an exemplary screenshot of optional player information based on a midpoint drill of the Fine-Tuned App.

DETAILED DESCRIPTION

Figure 14:
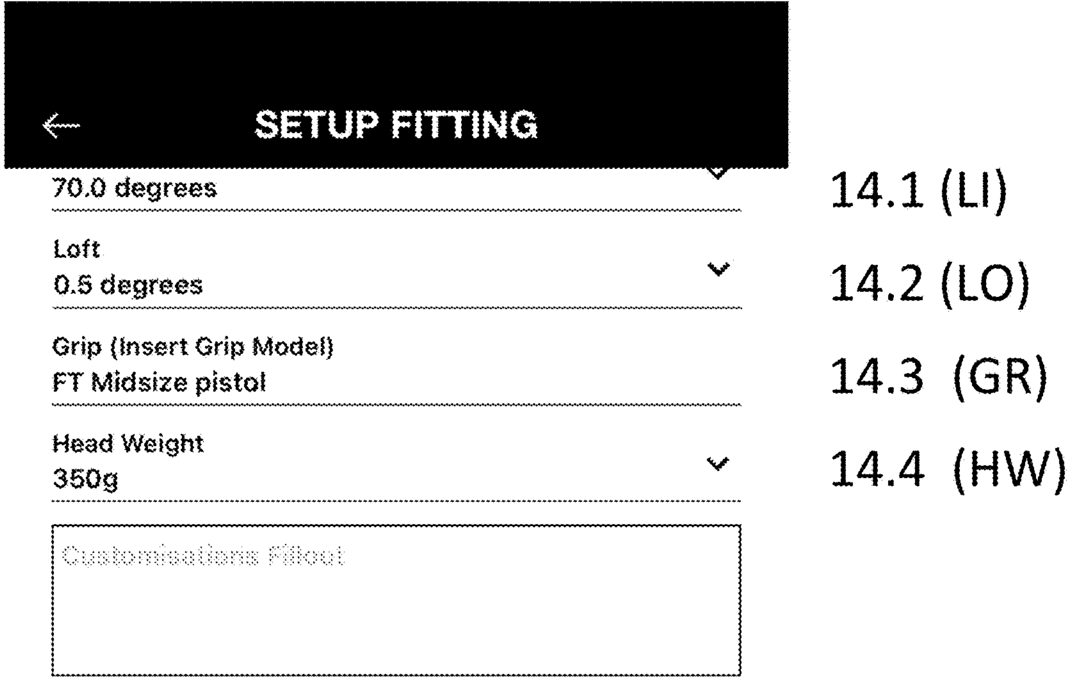
FIG. 14 illustrates an exemplary screenshot of setup fitting (Dynamic Assessment) page 12 (bottom of screen) of the Fine-Tuned App.

As noted above, described herein is a method for fine-tuning a putter and manufacture thereof. More specifically, an application (App) that is utilised for static and dynamic data point analysis along with algorithms to best determine how attributes of a putter need to be set up to maximise consistency of a user's putter stroke and roll of the ball. A customised putter is tailored and manufactured for each individual based on the output data of the App and a fitting system of the putter is multi-adjustable therein.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'fine-tuned' or grammatical variations thereof refers to small adjustments to a putter in order to tailor and customise to an individual user to achieve the best or a desired performance such that consistency of stroke and roll of the ball is maximised.

The term 'algorithm' should be understood to be a sequence of manual and/or computer-implementable process or set of instructions to be followed in calculations or other problem-solving operations.

In a first aspect there is provided a method for fine-tuning a putter comprising the steps of:

a) inputting user data into an App;
b) collecting further data obtained from measuring static and dynamic movements obtained from preferably a high speed camera and computer analysis and/or other measured variables obtained from optional sensors;
c) packaging and collating the data within the App;
d) outputting the data; and
e) analysing and applying at least one algorithm to the data set to best determine how attributes of the putter correlate to predetermined algorithmic values for putter set up to maximise consistency of a user's stroke and roll of ball while putting and for determining the correct specification of a user's putter.

The App may be used to determine and report on what a golfer's tendencies are and how that may affect their equipment selection, in particular to a putter.

In preferred embodiments, the App may allow the user to capture and analyse specific parameters that may include, but should not be seen as limited to any one of the following: wrist to ground measurement, height, eye dominance, current putter length, aim tendency, miss tendency, face rotation (rate of rotation), posture (eyeline position, hand position relative to shoulders, shaft to forearm relative angle, amount of spine angle), ball position face on, shaft lean face on, roll launch and spin, and stroke direction.

Preferably, with data collected from the parameters above, each data point may have a value of which is used in an algorithm to determine the correct putter specification for the player. It is further envisaged that within the app, the user may adjust the specification, then report on what selections may be made to achieve the desired result.

In this way, a putter may be manufactured that results in a specification other than standard. The inventor has found that the probability of ending up with a 35", 70 degree lie and 4 degree loft, 350 g headweight from most golf stores is high, yet this is very unlikely to be optimal for most players.

In preferred embodiments, the App may be based on analysis of technique, static positions, dynamic movement and recommendation of equipment. In this way, the App not only measures the player itself, but may record insightful information about the fitting process and how players may react to the given putter specifications.

As above, the App may check the static and dynamic analysis which may be primarily visual. However, this should not be seen as limiting as conceivably the App may be linked in with other technologies for data point analysis. In this way, other technologies such as MatLab and/or the Quintic Ball Roll Research System, high speed cameras, computer analysis and the like may be utilised to compare to particular traits of those data point positions for use with an algorithm(s). In this way, the App may check the body/club positions and rate them to a scale of extreme which then may provide the value for the algorithms.

The ability to accurately determine putter specifications for an individual or user may be derived from consistent analysis of a data set from grouped data of golfers of which can be determine trends. The grouped data may be data formed by aggregating individual observations of a variable into groups, so that a frequency distribution of these groups may serve as a convenient means of summarising or analysing the data.

When reviewing a range of golfers' putting techniques, it can be seen that there are a number of different styles and tendencies such that it looks difficult to organise the variables. However, the inventor has developed an inventive solution in the form of an App and associated algorithms. The App may assess for every style or tendency, such that the App will determine the correct putter fit somewhere in a predetermined range, whether it be individual and uncommon, to a fit that may be more textbook and ideal parameters.

Without being bound by theory, the App may utilise an algorithm based on statistical analysis derived from binomial distribution. The binomial distribution may be derived from a Galton board (also known as a Quincunx), a physical model of the binominal distribution which illustrates the central limit theorem; when you add independent random variables, their sum tends toward a normal distribution. Furthermore in this way, the App may utilise collected and analysed grouped data of golfers to assist in consumer driven research. For example, an original equipment manufacturer (OEM) of golf putters usually manufactures with a standard shaft length that may vary between 34 to 35 inches. However, from the grouped data collected from golfers and inputted into the App, it may be determined that the most common or median shaft length that should be used by golfers is approximately 32 inches. With this new insight hypothetically OEMs should be manufacturing at least their 'off the shelf' putters with a shaft length of 32 inches. That way, they can save on manufacturing costs and at least target sales of putters with shaft lengths that suit most golfers around the normal distribution curve. It should be appreciated that this analysis may also apply to shaft weight, head and hosel configuration and the like etc. Advantageously, this type of App data collection and analysis contrasts with current sales based research where manufacturers may allocate the dimensions/configuration of their club manufacture based around actual sales. For example, an OEM may manufacture more 34 to 35 inch length putters based on sales even though statistically median golfers should hypothetically be using a 32 inch putter as determined by data collected within the App.

The algorithms within the App may utilise data points or parameters taken from either measurements, selections or categorisations (either manually or automatically using software) of images to determine a grading scale or code for input into the algorithm. The relative position (e.g. ball to body position or the like) may be arbitrarily graded from a scale of 1 to 5 scale of which creates a number for the code. An exemplary example may be the eyeline position ($E_1$) of a player. A player that is 2" too far over the ball would be assessed and graded and given a code value of 1, directly over the ball (code value of 3) to the other extreme where they would be 2" inside the ball (code value of 5) and the like. These codes may then be used in the algorithm and further inputted in relation to other variables to create the recommendations derived from the algorithms.

In a second aspect there is provided a fine-tuned or customised putter manufactured for each individual based on the output data of the App and method as described herein.

In a third aspect there is provided a fitting system for the manufacture of a multi-adjustable putter comprising:

- a shaft;
- a putter head;
- an adjustable and/or interchangeable striking face plate; and
- wherein, the adjustable/interchangeable face plate maintains the loft to sole relationship of the putter head such that the putter head remains on a neutral axis to the shaft when the loft of the striking face plate is adjusted.

As above, the Fine-Tuned fitting App is a comprehensive fitting and analysis tool that may use a player's static and dynamic measurements, tendencies and attributes to best determine the correct specification for their putter. It has been found that golfers can become very predictable in how they will move or operate when the correct data is taken into consideration. In this way, the App may record and analyse this data to improve a golfer's success in putting by allowing them to have the optimum putter specification to maximise consistency of their stroke and roll of the ball.

The fitting process may be configured to look at all aspects that contribute to how a golfer strokes their putter. It has been found that different setups may have an effect on how a golfer aims, strokes, strikes and consequently how they roll the putt.

Because golfers vary in body size and proportion, optimum club fit varies from person to person. For example, the angle of the club head relative to the shaft, or lie, is one such aspect which must be determined and maintained along with the loft to sole relationship of the putter head.

Therefore, it is envisaged that the fine-tuned fitting matrix may have over 30,000 configurations that may include, but should not be seen as limited to: head shape and alignment lines, head and overall weight, neck offset and rotation axis, lie angle, loft, length, and/or grip.

In one embodiment, a sight marking on the topline of the putter and a line on the back of the flange may be utilised to create a perspective alignment tool. In this way, the fitting process uses an assessment of a player's perception of straight line, which may put the eyeline inside the ball such that the putter may be configured to have the topline sight dot machined closer to the heel of the putter to line up with the back flange line when the sole is substantially parallel to the ground surface.

The embodiments described above may also be said broadly to consist in the parts, elements and features referred to or indicated in the specification of the application, individually or collectively, and any or all combinations of any two or more said parts, elements or features.

The putter head embodiment with custom fitting may allow alignment of the Centre of Gravity (COG) tailored to the individual, for example, when changing heads, hosels and the like. In this way, based on stroke and strike tendencies, the COG may be substantially aligned to line up in order to achieve the most neutral spin axis of the golf ball for the player by allowing them to hit the optimum position (known in the art as the 'sweet spot') of the striking face plate of the head. In this way, this configuration may allow full customisation of the putter head where the putter, for example, may be manufactured to have a more toe weighted bias, if that is where it is found that the player consistently needs the weight to be positioned to provide the effective sweet spot.

The inventor has found that variable milling depths of the strike faceplate may be used to control the speed of the ball. Without being bound by theory, the deeper the milling, the more the ball compresses into the strike faceplate pattern, and it slows the speed. There are concepts of this aspect that allow the dispersion of the milling pattern to compensate in the loss of ball speed due to a poor strike. For example, this works well for a robot where the heel and toe travel at the same speed.

Preferably, the milling pattern may be tailor-milled based on a player's tendencies. For example, a player who cuts across the ball, rotates the toe faster or slower and the like.

It should be appreciated that the milling of the strike faceplate should not be seen as limited to bulge and roll, but may also be utilised to offset mishits. In this way, the depth of the milling may also enable a closed face on a toe strike to be offset by a relieved bulge which starts the ball more to the right than it would with a square face. Based on the data collected from the custom fitting App, it may be determined if a player missing the putt on the toe, is cutting across the ball which would often results in a pull. The milling may then be individually matched to assist with correction of the missed putt. The advantage of customisation of a milled faceplate is that the putter may still have the perception of a square face, but could offset mishit putts.

Further, where specific integers are mentioned herein which have known equivalents in the art to which the embodiments relate, such known equivalents are deemed to be incorporated herein as if individually set forth.

WORKING EXAMPLES

The above described methods, apparatus and manufacture thereof are now described by reference to specific examples.

As aforementioned, the algorithms within the App utilise data points taken from either measurements, selections or categorisations (either manually or automatically using software) of images to determine a grading scale or code for input into the algorithm. The relative position such as ball to body position or the like is graded from a scale of 1 to 5 scale of which this creates a number for a code. A given example may be the eyeline position ($E_1$) of a player. We would grade an assessment of this player from 2" too far over the ball (code value of 1), directly over the ball (code value of 3) to the other extreme where they would be 2" inside the ball (code value of 5)—see for example FIG. 8 assessing eyeline where the position that most looks like the captured image would be given a code 2 (1" over the ball). This is later used in the exemplary algorithm (Table 1 below) and a full working example of determining optimal shaft length as shown in FIG. 21 for its relation to other variables to create putter recommendations derived from the algorithms.

TABLE 1

Exemplary algorithm to determine recommended length of a putter using eyeline ($E_1$) as one of the variables to determine the correct putter specification using the formula above.

| | | | | | | | | |
|---|---|---|---|---|---|---|---|---|
| L (Length of Putter) | = | (x + $L_1$) | | | | | | |
| x | = | (WTG FIG. 3.7 | + | CPL) FIG. 4.3 | ÷ 2 | | | |
| $L_1$ | = | $E_1$ FIG. 8 | + | $SP_1$ FIG. 7 | + | $A_1$ FIG. 4 (4.6) | = | value in FIG. 21 |

Example 1

With reference to FIG. 1, an overview flowchart of the Fine-Tuned App is illustrated which shows the overall process conducted during a custom putter fitting assessment which results in a putter specification other than standard and which is specifically tailored to the end user. A logical walkthrough of each screenshot or page of the App is described further below.

Home Page 1 (FIG. 2)

A user will have the option to select either a "New fitting session" or a "New Spec Form". The New Fitting session functions are described in the following below. The New Spec form is a fill out only form and is used to duplicate a specification or process an order.

Player Information Page 2 (FIG. 3)

The following details are entered as per below:

First name: Publishes in Portable Document Format Files (PDF) report

Last Name: Publishes in PDF report

Email: Publishes in PDF report

Contact Number: Publishes in PDF report

Handicap: Publishes in PDF report

Height: Publishes in PDF report/Comma-separated Values File (CSV)

Wrist to Ground: Publishes in PDF report/Used in Algorithm

Dexterity: Publishes in PDF report/Used in Algorithm (only to determine picture sets)

Initial Setup Analysis Page 3 (FIG. 4)

The following details are entered as per below:

Current Putter Model: Publishes in PDF report

Current Putter Category (CPC): Publishes in PDF report

Current Putter Length (CPL): Publishes in PDF report

Current Shaft Plane angle (CSP): Publishes in PDF report/Used in algorithm

Dominant Eye (DE): Publishes in PDF report

Aim Tendency ($A_1$): Publishes in PDF report/Used in algorithm

Distance from the ball (DFB): Publishes in PDF report/eyeline ($E_1$) as one of the variables to determine the correct specification using the formula below Tempo (T1): Face Rotation ($R_1$): Publishes in PDF report/Used in algorithm Face Rotation ($R_1$): Publishes in PDF report/Used in algorithm Miss Tendency ($M_1$): Publishes in PDF report/Used in algorithm (FIG. 21 shows set up algorithms)

Initial Setup Photo Page 4

A down the line image is captured (see FIG. 5) which is published in a PDF report Setup Classification (Hand Position) Page 5

For analysis, an image (see FIG. 6) that is the most appropriate or emulates the user is selected. Each image is associated to a numerical value used in the algorithm. This publishes in PDF report.

Setup Classification (Shaft to Forearm Plane) Page 6

For analysis, an image (see FIG. 7) that is the most appropriate or emulates the user is selected. Each image is associated to a numerical value used in the algorithm. This publishes in PDF report.

Setup Classification (Eyeline) Page 7

For analysis, an image (see FIG. 8) that is the most appropriate or emulates the user is selected. Each image is associated to a numerical value used in the algorithm. This publishes in PDF report.

Setup Classification (Posture) Page 8

For analysis, an image (see FIG. 9) that is the most appropriate or emulates the user is selected. Each image is associated to a numerical value used in the algorithm. This publishes in PDF report.

Initial Set Up Photo (Capture Face ON Image) Page 9

A face on image (image 2 of FIG. 10) is captured of the user and publishes in PDF report.

Setup Classification (Ball Position Face on) Page 10

For analysis, an image (see FIG. 11) that is the most appropriate or emulates the user is selected. Each image is associated to a numerical value used in the algorithm. This publishes in PDF report.

Setup Classification (Shaft Lean) Page 11

For analysis, an image (see FIG. 12) that is the most appropriate or emulates the user is selected. Each image is associated to a numerical value used in the algorithm. This publishes in PDF report.

Set Up Fitting (Head, Hosel (Neck), Length, Lie, Loft and Grip) Page 12 (Top of Screen)

With reference to FIG. 13, Head: Recommendation will use new algorithm page for initial setup recommendation including head, hosel, length, lie, loft and grip.

Recommendation of Spec (Length): As per current putter configuration page with length and lie derived from initial setup classification algorithm (FIG. 21) on page 1 and 2 and stickman analysis of images pages 3 to 10.

Recommendation of spec (Lie): As per current putter configuration page with length and lie derived from initial setup classification algorithm (FIG. 22) on page 1 and 2 and stickman analysis of images Pages 3 to 10.

FIGS. 23, 24, 25, 26 and 27 show the corresponding algorithm calculations for hosel, loft, head and head weights respectively.

Setup Fitting (Dynamic Assessment) Page 12 (Bottom of Screen)

As shown in FIG. 14, an exemplary screenshot of setup fitting (Dynamic Assessment) with the flowing data inputs:

Aim tendency ($A_1$): Used in Algorithm (Stroke and Strike algorithm sheets—see FIGS. 22 and 23)

Stroke Direction Down the line (SD): Used in Algorithm (Stroke and Strike Algorithm sheet—see FIGS. 22 and 23)

Rate of Rotation (R): Used in Algorithm (Stroke and Strike Algorithm sheet—see FIGS. 22 and 23) Start Direction (ST): Used in Algorithm (Stroke and Strike Algorithm sheet—see FIGS. 22 and 23) Launch (LN): Used in Algorithm (launch Algorithm sheet—see FIG. 26)

Set Up Photo Page 13

As shown in FIG. 15, This is where a club fitter will take a photo and analyse the positions with the new putter configuration to analyse the positions again with the recommended putter configuration as performed from pages 4-11 (pages 15-21 of App not shown);

Putter Configuration Page 23

Figure 17A:
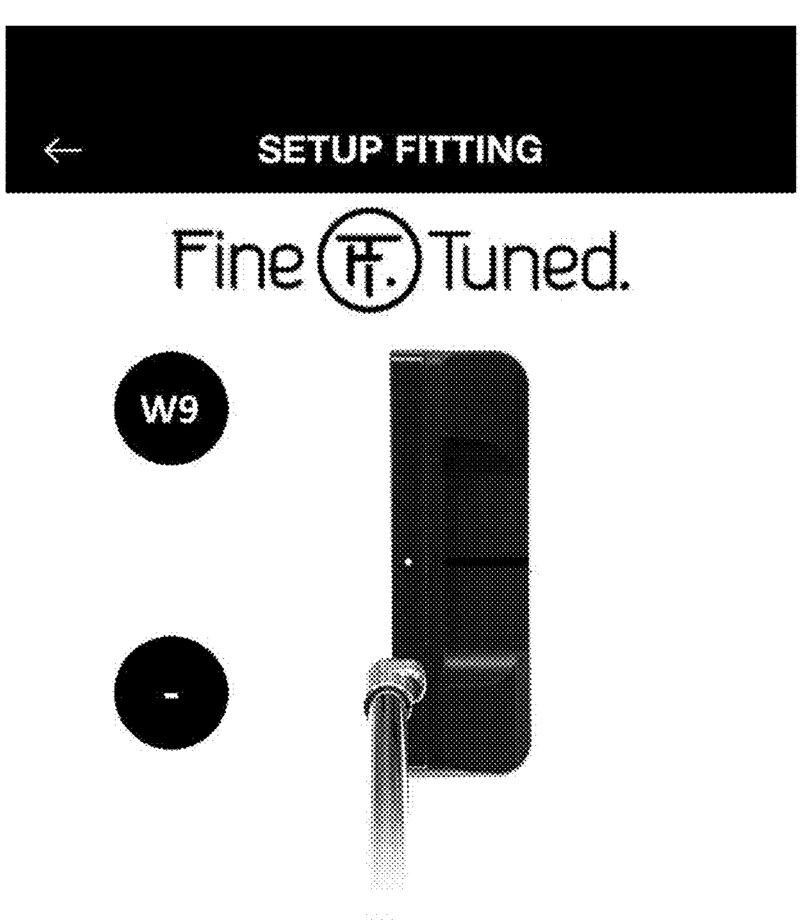
FIG. 17 illustrates an exemplary screenshot of putter configuration page 23 of the Fine-Tuned App.
Figure 17B:
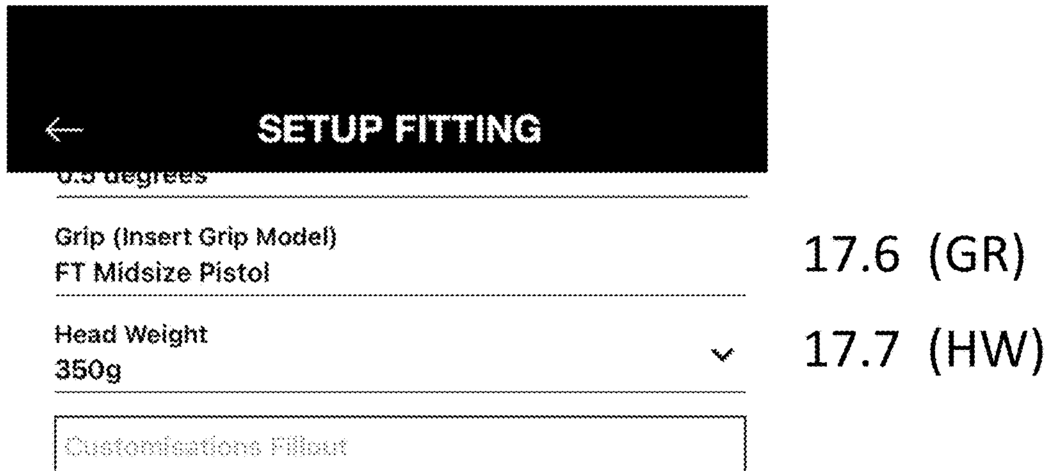
Figure 19:
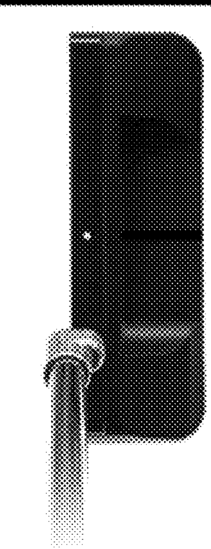
FIG. 19 illustrates an exemplary brief PDF summary of a user's putter fitting details and specification.

As shown in FIG. 17, this page gives the club fitter the option to adjust the settings and review the fitting process from page 14 (FIG. 16) again i.e. "CLASSIFY NEW CONFIGURATION" or to "APPROVE FITTING RESULTS" to which it will then publish the putter specifications as a CSV (FIG. 18), PDF summary page (FIG. 19) and email (FIG. 20).

Example 2

Figure 28:
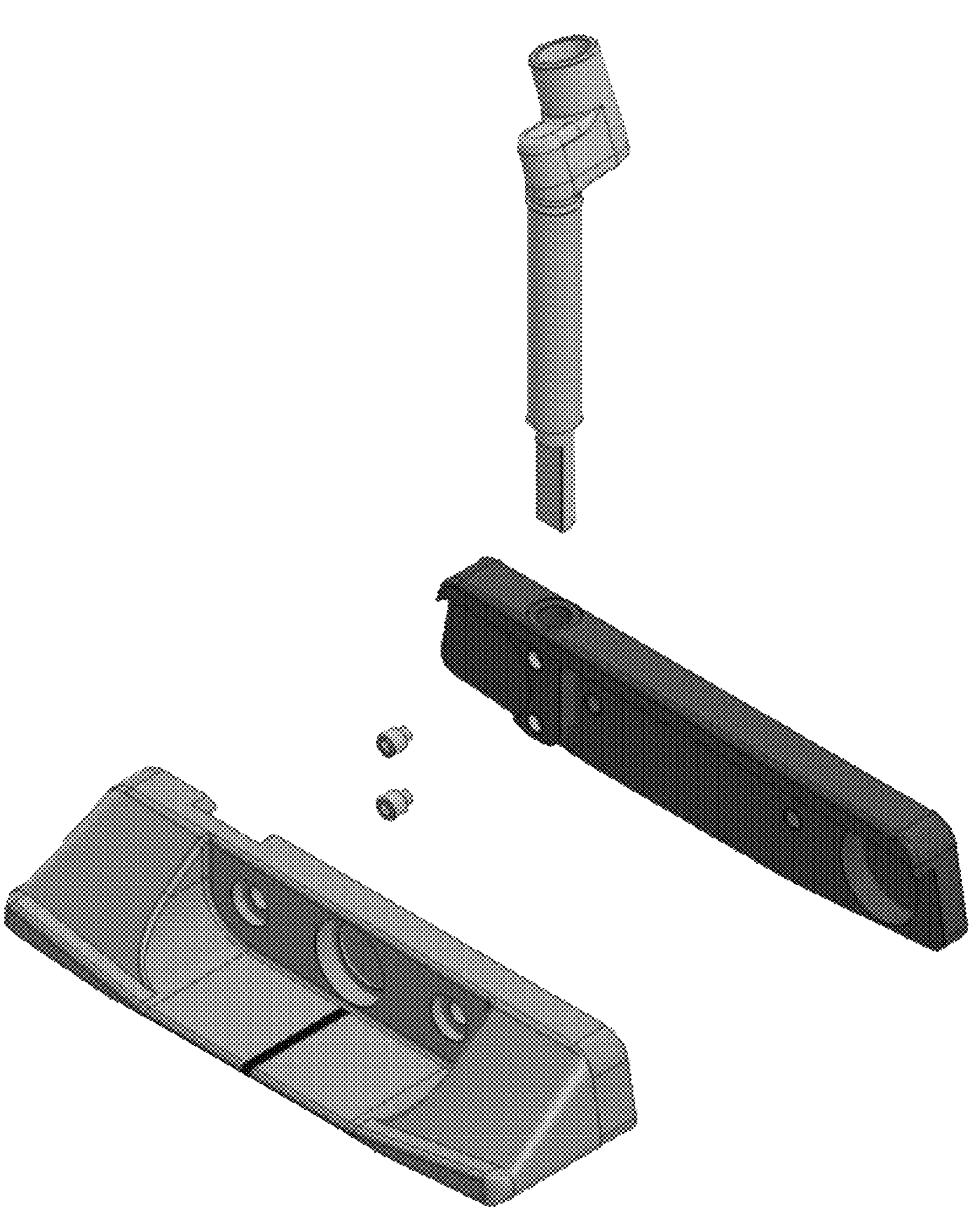
FIG. 28 illustrates an exemplary fitting system and adjustable component of a putter manufactured from the data output of the App.

With reference to FIG. 28, based on the App data and analysis above, an exemplary component fitting system for the manufacture of a multi-adjustable putter comprising: a shaft; a putter head; and an adjustable and/or interchangeable striking face plate is shown.

As above, the fitting system of the putter is multi-adjustable which is not only dexterity neutral i.e. to suit both left- and right-handed player, the use of an adjustable/interchangeable face plate maintains the loft to sole relationship of the putter head when the loft of the striking face plate is adjusted.

This configuration allows the putter head to remain on a neutral axis to the shaft when the loft of the striking face plate is adjusted.

Example 3

Figure 29:
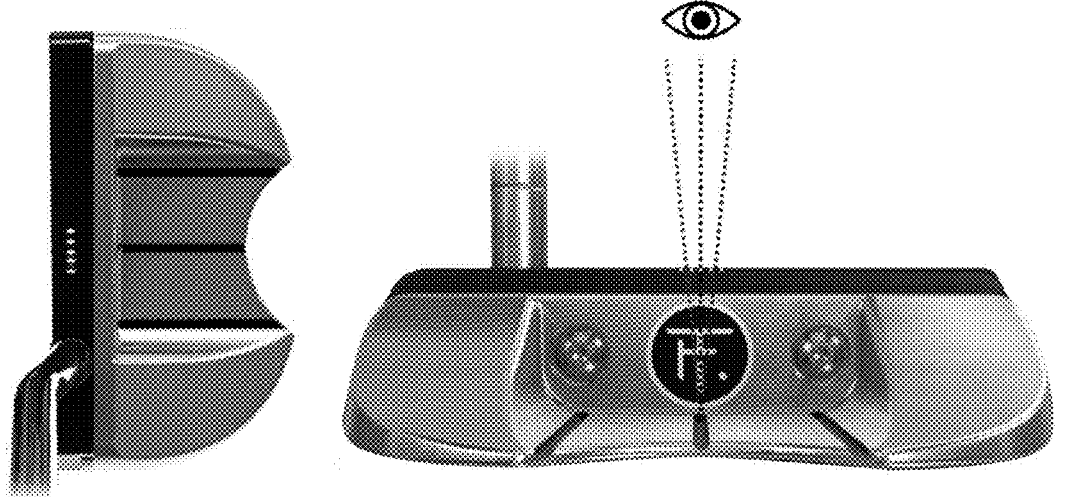
FIG. 29 illustrates an exemplary perspective alignment embodiment of a putter manufactured from the data output of the App.

With reference to FIG. 29, a putter head embodiment is shown where the intention is to rest the putter head flat on the sole to create a consistent set-up position. It has been found that when the sole is substantially parallel to a ground surface, a player is able to calibrate eye position and distance from the ball to where the putter sits. To enable this set-up position, a sight marking on the topline of the putter and a line on the back of the flange is utilised to form a perspective alignment tool.

The App fitting process uses assessment of a player's perception of a straight line, for example, which may place the eyeline inside the ball (red dot or right of centre), so the putter is configured to have the topline sight dot machined closer to the heel of the putter to line up with the back flange line when the sole is substantially parallel to the ground surface.

Example 4

Figure 30:
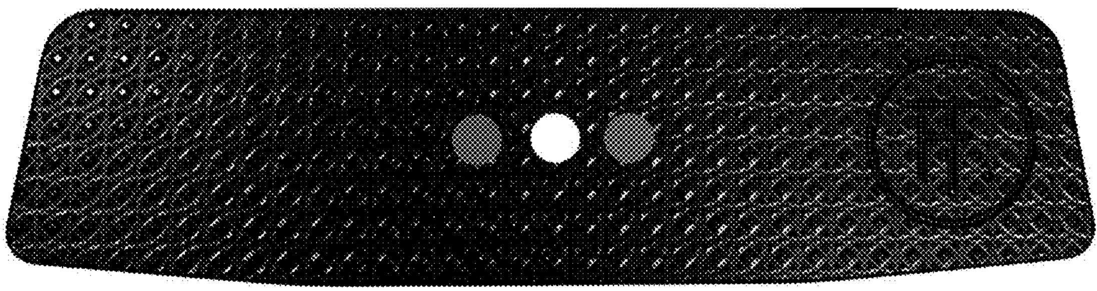
FIG. 30 illustrates an exemplary putter head embodiment with adjustable Centre of Gravity (COG) manufactured from the data output of the App.

With reference to FIG. 30, the modular nature of a putter head embodiment is shown where the custom fitting allows alignment of the Centre of Gravity (COG) tailored to the individual, for example, when changing heads, hosels and the like. In this way, based on stroke and strike tendencies, the COG can be substantially aligned to line up in order to achieve the most neutral spin axis of the golf ball for the player by allowing them to hit the sweet spot of the striking face plate of the head.

This configuration allows full customisation of the putter head where the putter is manufactured to have a more toe weighted bias, if that is where it is found that the player consistently needs the weight to be positioned to provide the sweet spot. For example, the blue dot (left of centre) in FIG. 30 represents an increase in toe weight by 10 grams and a reduced heel by 10 grams.

Example 5

Figure 31A:
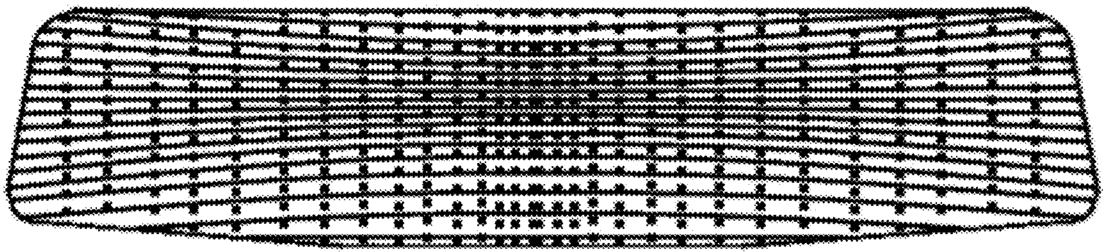
FIG. 31 illustrates face on exemplary strike faceplates of putter head embodiments with variable milling depths; A) Even Toe to Heel Speed Mill (Square Stroke); B) Faster Toe or High Rate of Rotation Mill (Push Stroke); and C) Passive or Negative Rotation (cut stroke) manufactured from the data output of the App.
Figure 31B:
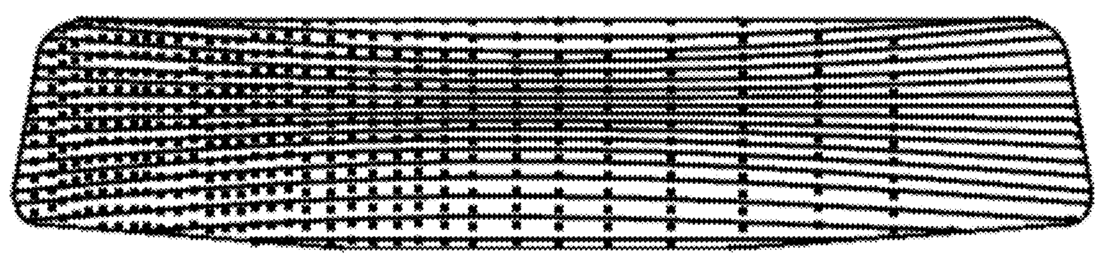
Figure 31C:
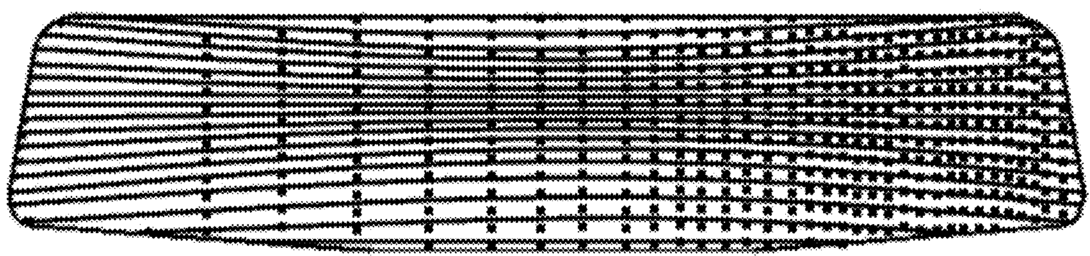
Figure 32A:
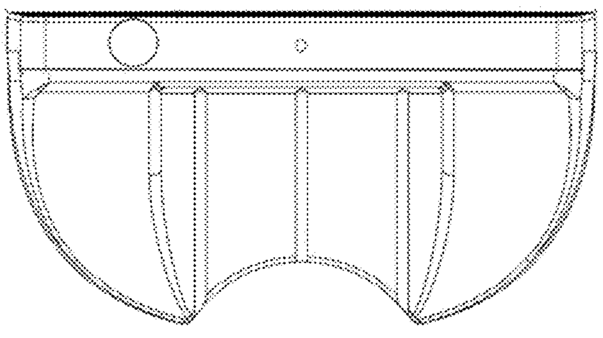
FIG. 32 illustrates top views of exemplary putter head embodiments with variable milling depths; A) Traditional Square Putter Face (Surface is completely flat); B) Bulge Putter Face (Corrects pull misses off toe strikes and push misses off heel strikes); C) Negative Bulge Putter Face (Corrects push misses off toe strikes and pull misses off heel strikes stroke); D) Negative Bulge in Heel (Suitable for push strokers who over-rotate, heel strike and pull miss); and E) Negative Bulge in Toe (Suitable for pull strokers with passive rotation, toe strike and push miss) manufactured from the data output of the App.
Figure 32B:
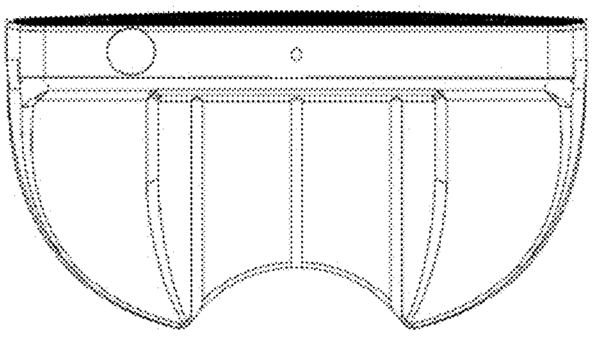
Figure 32C:
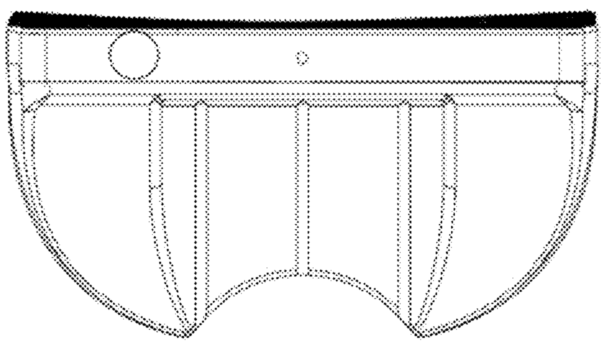
Figure 32D:
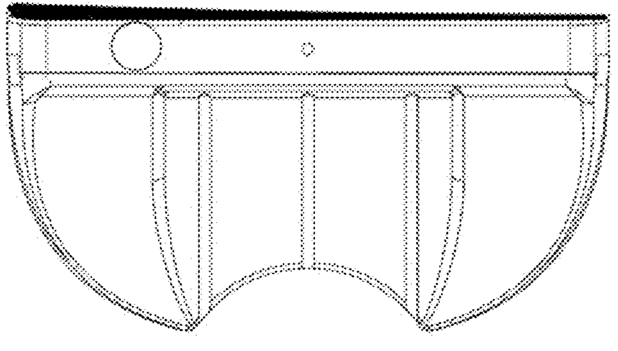
Figure 32E:
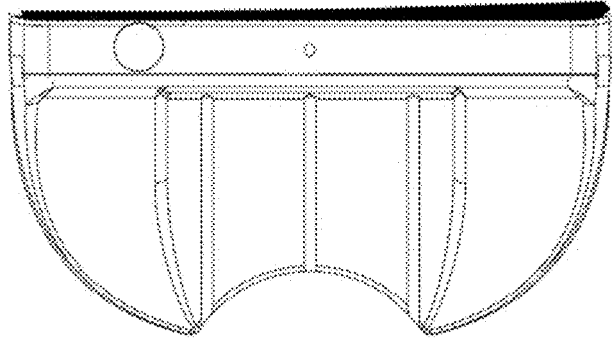

With reference to FIGS. 31A, B, C and 31 A, B, C, D and E, variable milling depths of the strike faceplate is shown. These configurations are used to control the speed of the ball.

The milling pattern is tailor milled based on a player's tendencies. For example, a player who cuts across the ball, rotates the toe faster or slower and the like.

Furthermore, the milling of the strike faceplate is utilised to offset mishits. In this way, the depth of the milling also enables a closed face on a toe strike to be offset by a relieved bulge which starts the ball more to the right than it would with a square face. Based on the data collected from the custom fitting App, it can be determined if a player missing the putt on the toe, is cutting across the ball which would often results in a pull. The milling is then individually matched to assist with correction of the missed putt as shown in FIGS. 32 A, B, C, D and E.

Example 6

With reference to FIG. 33, an optional screenshot or page of the App is shown. This is a further parameter to check with players and is another consideration when adjusting a player's alignment characteristics. A player is directed to set up to a ball up from approximately 12 feet from the hole. The operator of the App pushes a ball into the midpoint of the putt and the player is requested to inform the operator when to stop when it intersects the putt. It has been found that this process correlates with factors such as eye dominance, distance from ball and which ball lines up with the hole. For example variants to these factors such as the more left the selection of ball, the further away, longer the putter, and more upright etc. will determine the type of corrections that are required to be inputted in the App.

Aspects of the present invention have been described by way of example only and it should be appreciated that modifications and additions may be made thereto without departing from the scope of the claims herein.

What is claimed is:

1. A computer-implemented method of generating a configuration of a customized golf club comprising a putter, the putter being customized to a user, comprising:

receiving static metric image data and dynamic metric image data representing an image of the user holding an uncustomized putter at a computer as data inputs from a static metric image generator and a dynamic metric image generator;

applying, by the computer using data point analysis, an algorithm to the data inputs, the algorithm based on statistical analysis derived from a binomial distribution derived from a Galton board, such that addition of independent variables results in a sum tending toward a normal distribution to best determine how attributes of the putter correlate to predetermined algorithmic values for putter setup; and generating the configuration of the customized putter based on the algorithm to maximize consistency of stroke and roll of a ball hit by the user using the customized putter;

wherein the algorithm allows the user to adjust the configuration, then report on what selections are made to achieve the desired result of manufacturing a putter for the player that results in a specification other than a standard OEM putter.

2. The computer-implemented method of claim 1, wherein the image of the user holding the uncustomized golf club includes a capture of the user in a position in which the user would engage the uncustomized golf club with a ball.

3. The computer-implemented method of claim 1, wherein the image of the user holding the uncustomized golf club is taken from one or more of a down the line perspective and a face on perspective.

4. The computer-implemented method of claim 1, further comprising:

receiving at least one user physical specification; and receiving at least one specification of the uncustomized golf club, wherein the uncustomized golf club is not customized for the user, wherein the generation of the configuration is further based on one or more of the at least one user physical specification and the at least one specification of the uncustomized golf club.

5. The computer-implemented method of claim 4, wherein the received at least one user physical specification includes one or more of user height, user wrist to ground length, and user handedness.

6. The computer-implemented method of claim 4, wherein the received at least one specification of the uncustomized golf club includes one or more of model, type, length, head shape, alignment lines, neck offset, rotation axis, lie angle, loft, and grip.

7. The computer-implemented method of claim 1, wherein the generated configuration includes a customized distance between a topline sight and a heel of the customized golf club, wherein the customized distance is adapted to line up the topline sight with a back flange of the customized golf club when a sole of the customized golf club is substantially parallel to a ground surface.

8. The computer-implemented method of claim 1, wherein the generated configuration includes an alignment of a center of gravity, wherein the alignment causes the customized golf club to achieve a neutral spin axis of a ball.

9. The computer-implemented method of claim 1, wherein the generated configuration includes a customization of a striking face plate of the customized golf club, wherein the customization of the striking face plate includes one or more of a milling depth and a milling pattern.

10. The method of claim 1, wherein the data inputs comprise any one or more of the following: wrist to ground measurement, height, eye dominance, current putter length, aim tendency, miss tendency, face rotation (rate of rotation), posture (eyeline position, hand position relative to shoulders, shaft to forearm relative angle, amount of spine angle), ball position face on, shaft lean face on, roll launch and spin, and stroke direction.

11. The method of claim 10, wherein the data input comprises a numerical value used by the algorithm to determine the correct putter specification.

12. The method of claim 1, wherein the applying the algorithm comprises data point analysis utilized to compare particular traits of the data inputs with the algorithm using any one of the following: high speed cameras and computer analysis.

13. The method of claim 1, wherein the algorithm checks relative body to club positions and rates the positions on a scale relative to a predetermined median scale to provide a value for the algorithm.

14. The method of claim 1, wherein the configuration for the user is derived from consistent analysis of a data set from grouped data of golfers, such that trends are determined;

wherein the grouped data is formed by aggregating individual observations of a variable into groups, so that a frequency distribution of these groups serves as a means of analyzing the data.

15. The method of claim 1, wherein the algorithm utilizes data points taken from either measurements, selections, or categorizations of images to determine a grading scale for input into the algorithm.

16. The method of claim 15, wherein the grading scale is arbitrarily graded from a scale of 1 to 5;

wherein the grading scale is used in the algorithm and further inputted in relation to other variables to create recommendations derived from the algorithm.

17. The method of claim 1, wherein a fitting matrix comprises at least 30,000 configurations selected from on or more of the following: head shape and alignment lines, head and overall weight, hosel (neck) offset and rotation axis, lie angle, loft, length, and grip.

18. One or more non-transitory tangible processor-readable storage media embodied with instructions for executing on one or more processors and circuits of a computing device a process for generating a configuration of a customized golf club comprising a putter, the putter being customized to a user, the process comprising:

receiving static metric image data from a static image generator and dynamic metric image data from a dynamic metric image generator, the static metric image data and the dynamic metric image data representing data inputs of an image of the user holding an uncustomized putter;

applying an algorithm to the data inputs, the algorithm based on statistical analysis derived from a binomial distribution derived from a Galton board, such that addition of independent variables results in a sum tending toward a normal distribution to best determine how attributes of the putter correlate to predetermined algorithmic values for putter setup; and generating the configuration of the customized putter based on the algorithm to maximize consistency of stroke and roll of a ball hit by the user using the customized putter;

wherein the algorithm allows the user to adjust the configuration, then report on what selections are made to achieve the desired result of manufacturing a putter for the player that results in a specification other than a standard OEM putter.

* * * * *